(12) United States Patent
Okamoto

(10) Patent No.: US 6,311,750 B1
(45) Date of Patent: Nov. 6, 2001

(54) HEAVY DUTY PNEUMATIC RADIAL TIRES WITH PARTICULAR BELT RUBBER CONFIGURATION

(75) Inventor: Yoichi Okamoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/398,423

(22) Filed: Sep. 17, 1999

Related U.S. Application Data

(62) Division of application No. 09/066,998, filed on Apr. 27, 1998, now Pat. No. 6,016,859, which is a division of application No. 08/788,916, filed on Jan. 22, 1997, now Pat. No. 5,779,828.

(30) Foreign Application Priority Data

Jan. 22, 1996 (JP) .......................................... 8-8067
Jan. 8, 1997 (JP) .......................................... 9-1246

(51) Int. Cl.$^7$ ................. B60C 9/18; B60C 9/20
(52) U.S. Cl. ........................... 152/532; 152/537
(58) Field of Search ..................... 152/532, 537

(56) References Cited

U.S. PATENT DOCUMENTS 4,062,393    12/1977    Bertrand .

FOREIGN PATENT DOCUMENTS

| 2 661 870 | 11/1991 | (FR) . |
| 2 671 516 | 7/1992 | (FR) . |
| 1067856 | 5/1967 | (GB) . |
| 63-149202 * | 6/1988 | (JP) ..................................... 152/532 |
| 4-183605 | 6/1992 | (JP) . |
| 4-252705 | 9/1992 | (JP) . |
| 6-320906 | 11/1994 | (JP) . |
| 7-9811 | 1/1995 | (JP) . |
| 66168 | 1/1973 | (LU) . |

OTHER PUBLICATIONS

Patent Abstracts of Japan, 59–075807, Apr. 28, 1984, Bridgestone Corporation.

* cited by examiner

*Primary Examiner*—Adrienne C. Johnstone
(74) *Attorney, Agent, or Firm*—Sughrue, Mion, Zinn, Macpeak & Seas, PLLC

(57) ABSTRACT

A heavy duty pneumatic radial tire comprises a radial carcass and a belt superimposed about an outer periphery of the carcass and comprised of at least three rubberized cord layers, cords of two adjacent layers among these layers being crossed with each other at an acute cord angle with respect to an equatorial plane of the tire to form cross cord layers, in which a narrow-width cord layer among the cross cord layers is provided with an end cover rubber having a particular 100% modulus and a space cushion rubber having a particular 100% modulus.

1 Claim, 14 Drawing Sheets

FIG_2

FIG_3

FIG_11
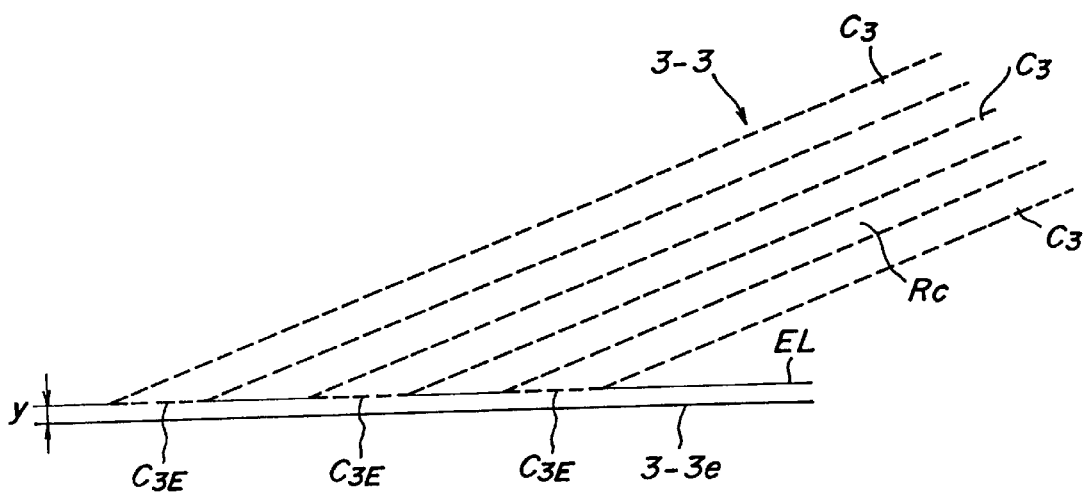
FIG_12
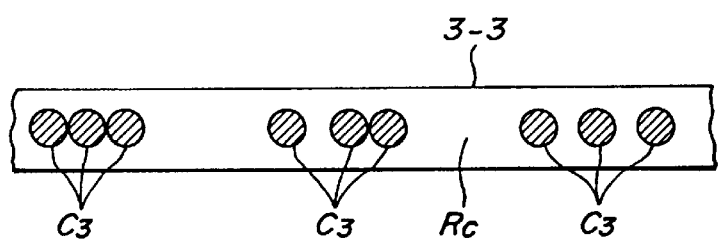

FIG_13a
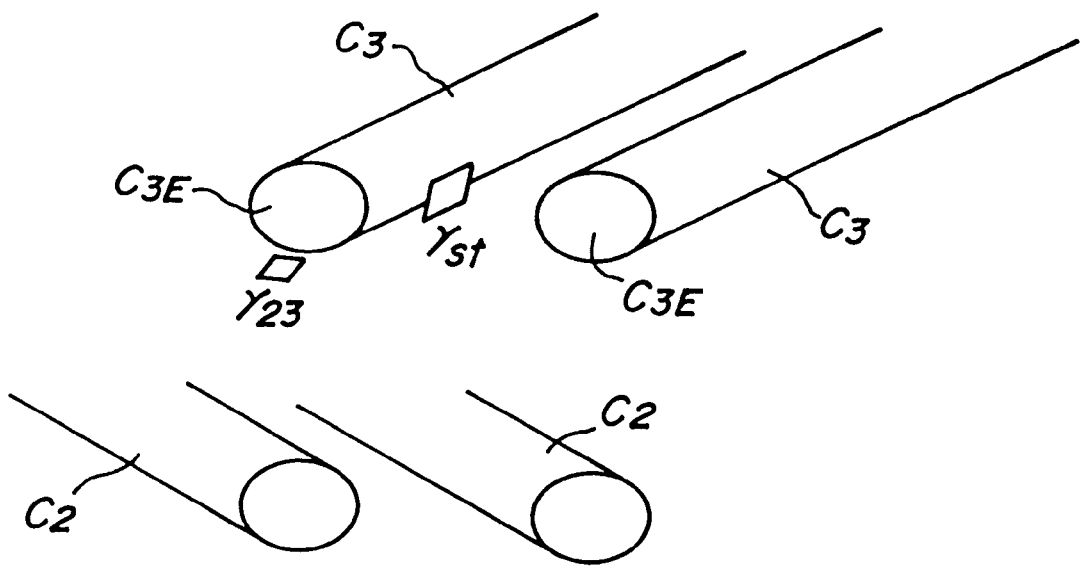
FIG_13b
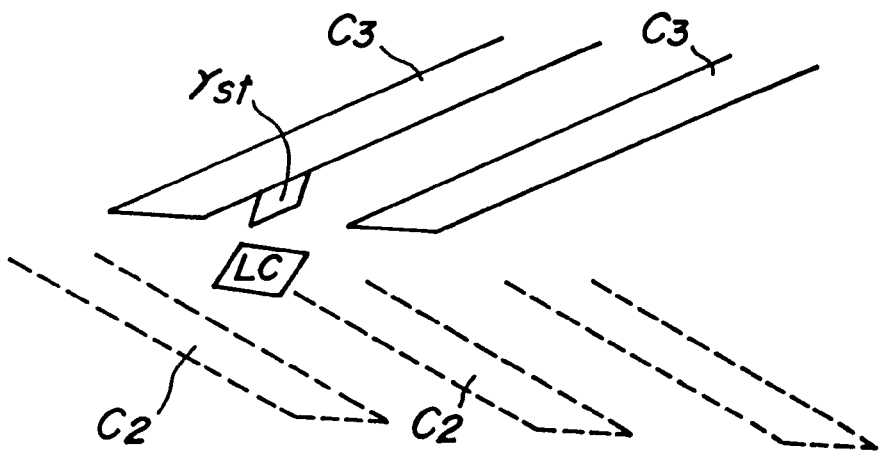

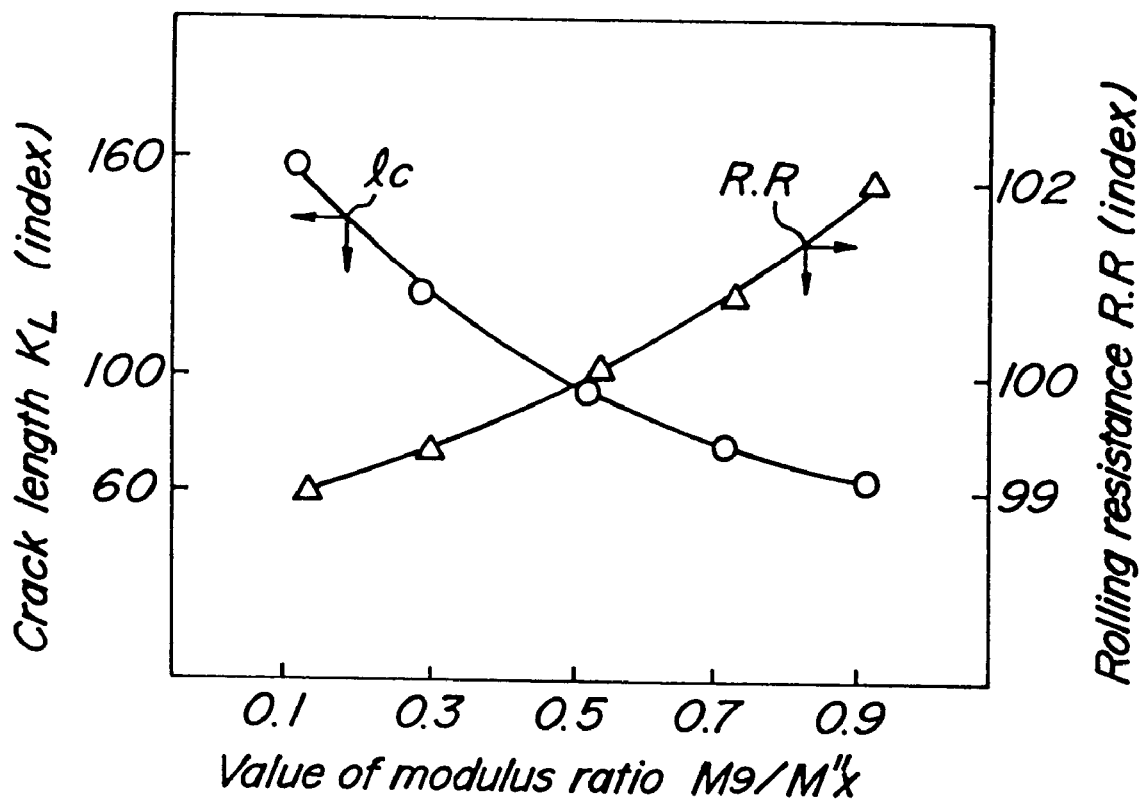
FIG_14

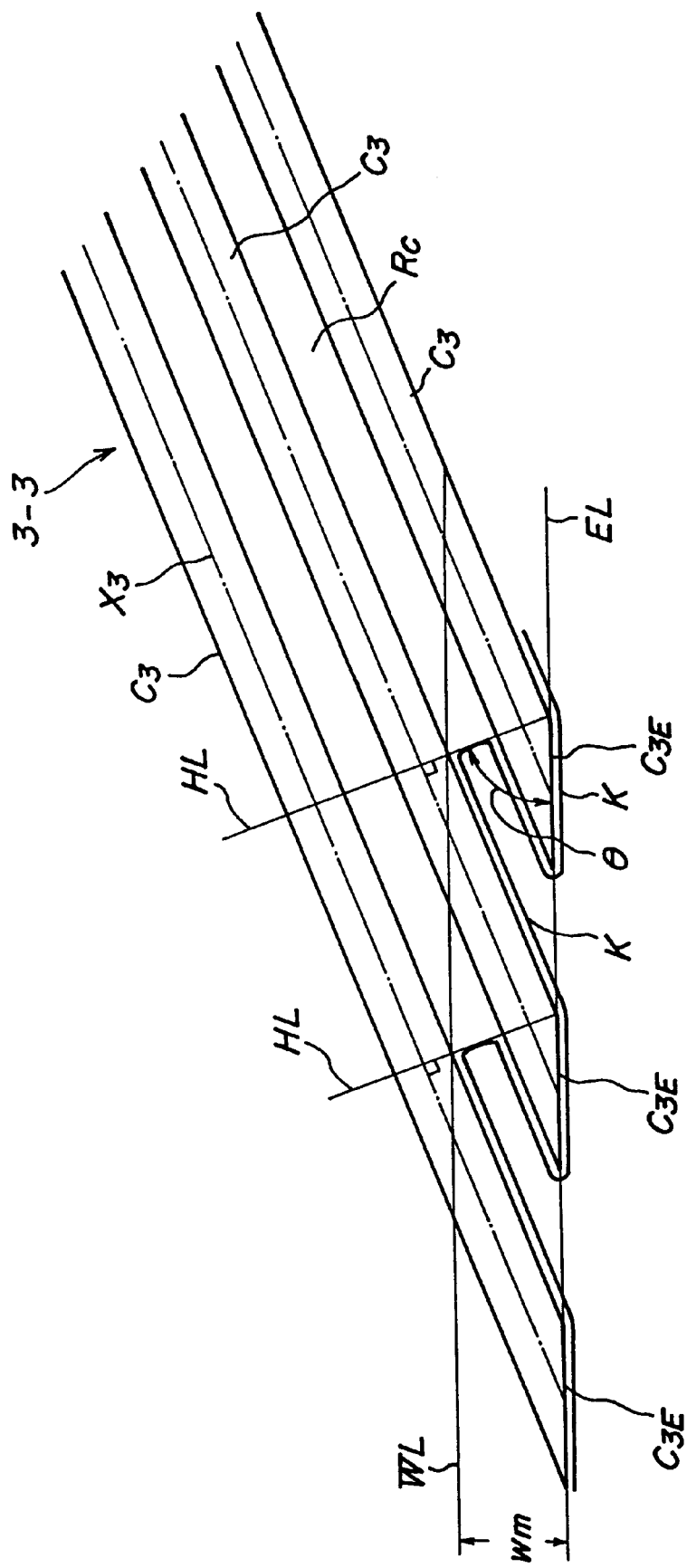

HEAVY DUTY PNEUMATIC RADIAL TIRES WITH PARTICULAR BELT RUBBER CONFIGURATION

This is a divisional of application Ser. No. 09/066,998 filed Apr. 22, 1998 now U.S. Pat No. 6,016,859 which is a Divisional of application Ser. No. 08/788,916 now U.S. Pat. No. 5,779,828 filed Jan. 22, 1997, the disclosure of which is incorporated herein by reference.

BACKGROUND OF THE INVENTION

1. Field of the Invention

This invention relates to a heavy duty pneumatic radial tire, and more particularly to a heavy duty pneumatic radial tire for use in truck and bus in which cracks liable to be created at an end portion of a cord layer in a belt and growth thereof are controlled and minimized to favorably suppress the occurrence of separation failure due to the crack growth when the tire is applied to a heavy duty vehicle such as truck and bus.

2. Description of Related Art

It is well-known that as the running distance of the pneumatic radial tire mounted onto the heavy duty vehicle such as small-large size truck and bus increases, cracks are created at a cord end of a narrow-width cord layer in cross cord layers having different widths, cords of which layers being crossed with each other at a relatively small cord angle with respect to an equatorial plane of the tire, among plural cord layers constituting the belt. The crack initially created is minute like "pecking" of the cord end, but such a minute crack propagates to a big crack along the cord as the running distance of the tire increases. When the crack growth progresses in a certain extent, the front end of the crack grows toward a cord end of the adjoining cord and finally cracks are connected to each other over substantially a full periphery of the cord layer along a side edge of the cord layer. If the crack growth is advanced to this stage, a running time is not taken so much until the separation failure is created between the cross cord layers.

Accordingly, a period ranging from the occurrence of minute crack at the cord end to the growth of connected crack along the side edge of the cord layer on its periphery controls a service life of the tire through belt separation failure. For this end, there are proposed various improving structures of the tire directed to the prolongation of tire running time (running distance) though the connection of cracks is unavoidable.

As the improving structure, JP-A-4-183605 proposes a heavy duty pneumatic radial tire wherein a cushion rubber is arranged between end portions of second and third cross steel cord layers counted from a side of a carcass in a belt comprised of 3 to 4 steel cord layers and an upper side of an end portion of the third layer is covered with a rubber layer having a thickness of not less than 1.5 mm to overlap over a distance of not less than 20 mm from the end of the layer and the rubber layer is made from rubber having a JIS hardness of 65–75 and a modulus at 300% elongation of 130–200 kgf/cm$^2$.

Furthermore, JP-A-4-252705 discloses a heavy duty pneumatic radial tire wherein a belt edge cushion rubber is interposed between end portions of two cross steel cord layers in a belt comprised of four steel cord layers and such end portion is covered with a rubber sheet having a thickness of 1.0–3.0 mm and 50% modulus of the rubber sheet is smaller than that of a coating rubber for the steel cord layer but larger that that of a base tread rubber. Moreover, JP-A-6-320906 proposes a heavy duty pneumatic radial tire wherein a belt comprised of four steel cord layers is arranged between a base tread rubber of low modulus and a carcass and a cushion rubber is disposed between end portions of second and third cross cord layers counted from a side of the carcass and the end portion is covered with a rubber sheet having a thickness of 0.8–3.3 mm likewise the case of JP-A-4-252705 and further the rubber sheet has a JIS hardness lower than those of rubber for the second and third cord layers and 50% modulus larger than that of the base tread rubber.

However, the effect of sufficiently controlling the crack growth under severe service conditions of heavy loading, running speed and the like can not be attained even by any improving structure of the belt described in these prior proposals, so that belt separation failure is naturally liable to be caused even in these new tires. Therefore, even if the tire is recapped, it is obliged to prematurely create such a failure. Although this type of the heavy duty pneumatic radial tire particularly tends to be important in the recapping adaptability, even when the above new tire is completely run, the occurrence of the big crack unsuitable for the recapping is frequently observed at the end portion of the belt. Therefore, it is demanded to further improve the crack resistance and resistance to crack growth at the end portion of the belt and hence considerably improve the resistance to belt separation.

SUMMARY OF THE INVENTION

It is, therefore, an object of the invention to provide a heavy duty pneumatic radial tire having an excellent long service life in which the crack resistance and resistance to crack growth at the end portion of the cord layer constituting the belt, particularly narrow-width cord layer in cross cord layers are sufficiently enhanced even under severer service conditions of the tire while sufficiently maintaining the rigidity-strengthening function inherent to the belt of the radial tire to thereby highly improve the resistance to separation in a new tire and also improve the recapping adaptability According to a first aspect of the invention, there is the provision of a heavy duty pneumatic radial tire comprising a radial carcass toroidally extending between a pair of bead cores bedded in a pair of bead portions and a belt superimposed about an outer periphery of the carcass to reinforce a tread portion and comprised of at least three rubberized cord layers, cords of two adjacent layers among these layers being crossed with each other at an acute cord angle with respect to an equatorial plane of the tire to form cross cord layers, in which an outer cord layer of the cross cord layers in a radial direction of the tire has a width narrower than that of an inner cord layer, and such a narrow-width cord layer is provided at its end portion with an end cover rubber covering the end portion and having a 100% modulus larger than that of a coating rubber for the narrow-width cord layer, and a space cushion rubber having a 100% modulus smaller than that of a coating rubber for each of the cross cord layers is disposed between the end portions of the cross cord layers so as to separate these end portions from each other exceeding the thickness of the end cover rubber.

In the first aspect, the position relation of the cross cord layers among the cord layers constituting the belt with respect to the radial carcass is not particularly critical, but it is desirable that the cross cord layers are second and third layers or third and fourth layers counted from a side of the radial carcass. Further, the end cover rubber indicates a sheet-shaped rubber covering each of the end portions of the narrow-width cord layer from both surfaces thereof in the radial direction of the tire otherwise specified. Also, the space cushion rubber is a rubber layer taperingly extending from an end of the narrow-width cord layer or the end cover rubber toward inside and outside of the tire. Moreover, the term "100% modulus" used herein means a tensile stress at 100% elongation (kgf/cm$^2$) measured according to a tensile test method of a vulcanized rubber defined in JIS K-6251 (1993).

In a preferable embodiment of the first aspect, the end cover rubber has the 100%. modulus larger by at least 1.2 times than that of the coating rubber for the narrow-width cord layer, and the space cushion rubber has the 100% modulus smaller by at least 0.95 times than that of the coating rubber for the cross cord layers.

In another preferable embodiment of the first aspect, the 100% modulus ($M_5$) (kgf/cm$^2$) of the space cushion rubber satisfies a relationship of $M_5 \leq M_x - (M_4 - M_x) \times (G_{4E}/G_{5E})$ with respect to 100% modulus ($M_4$) (kgf/cm$^2$) of the end cover rubber, 100% modulus ($M_x$) (kgf/cm$^2$) of the coating rubber for the cross cord layers, gauge ($G_{4E}$) (mm) of the end cover rubber at the inside of the end of the narrow-width outer cord layer in the radial direction of the tire and gauge ($G_{5E}$) (mm) of the space cushion rubber existing on a vertical line drawn from an inner end of the narrow-width cord layer in the radial direction of the tire to the inner cord layer of the cross cord layers.

In the other preferable embodiment of the first aspect, a width w (mm) of the end cover rubber at least located at the inside thereof in the radial direction of the tire satisfies a relationship of $w \geq (50 \text{ mm/N}) \times \sin \theta$ with respect to an inclination angle θ defined between a normal line drawn from a corner of any cord end in the narrow-width cord layer at its developed plane view to a center axis line of a cord adjacent thereto and a straight line passing through cord ends of this layer and an end count N of the narrow-width cord layer per 50 mm as measured in a direction perpendicular to the cords of the layer, and an inner end of the end cover rubber having the width w in the widthwise direction of the belt is located in a region of arranging the space cushion rubber.

In a further preferable embodiment of the first aspect, the end cover rubber covers the surface of the end portion of the narrow-width cord layer facing to the space cushion rubber and extends over this end portion toward the outside of the tire. This can be said to be simple as compared with the end cover rubber defined in the aforementioned preferable embodiments.

According to a second aspect of the invention, there is the provision of a heavy duty pneumatic radial tire comprising a radial carcass toroidally extending between a pair of bead cores embedded in a pair of bead portions and a belt superimposed about an outer periphery of the carcass to reinforce a tread portion and comprised of at least three rubberized cord layers, cords of two adjacent layers among these layers being crossed with each other at an acute cord angle with respect to an equatorial plane of the tire to form cross cord layers, in which an outer cord layer of the cross cord layers in a radial direction of the tire has a width narrower than that of an inner cord layer, and such a narrow-width cord layer is provided at its end portion with a double end cover rubber covering the end portion and comprised of an outer rubber and an inner rubber having different compositions, and the outer rubber has a 100% modulus larger than that of the inner rubber, and the inner rubber has a 100% modulus larger than that of a coating rubber for the narrow-width cord layer.

This double end cover rubber is a sheet-shaped rubber covering each of the end portions of the narrow-width cord layer from inside toward outside in the radial direction of the tire likewise the first aspect of the invention otherwise specified.

According to a third aspect of the invention, there is the provision of a heavy duty pneumatic radial tire comprising a radial carcass toroidally extending between a pair of bead cores embedded in a pair of bead portions and a belt superimposed about an outer periphery of the carcass to reinforce a tread portion and comprised of at least three rubberized cord layers, cords of two adjacent layers among these layers being crossed with each other at an acute cord angle with respect to an equatorial plane of the tire to form cross cord layers, in which an outer cord layer of the cross cord layers in a radial direction of the tire has a width narrower than that of an inner cord layer, and such a narrow-width cord layer is provided with an end cover rubber covering each of the end portions of this layer, and at least one of outer portion and inner portion of the end cover rubber in the radial direction of the tire forms a wavy form in a direction perpendicular to the cords arranged in the narrow-width cord layer, and a height between a bottom and a peak of the wavy surface is within a range of 0.05–0.25 mm.

In this case, the peak of the wavy form substantially corresponds with the position of the central axis line of the cord embedded in the narrow-width cord layer, while the bottom of the wavy form substantially corresponds with a central position between mutual adjoining cords. Moreover, an amplitude of the wavy surface in the end cover rubber is preferable to be within a range of 0.07–0.20 mm.

According to a fourth aspect of the invention, there is the provision of a heavy duty pneumatic radial tire comprising a radial carcass toroidally extending between a pair of bead cores embedded in a pair of bead portions and a belt superimposed about an outer periphery of the carcass to reinforce a tread portion and comprised of at least three rubberized cord layers, cords of two adjacent layers among these layers being crossed with each other at an acute cord angle with respect to an equatorial plane of the tire to form cross cord layers, in which an outer cord layer of the cross cord layers in a radial direction of the tire has a width narrower than that of an inner cord layer, and the cross cord layers are provided with a space cushion rubber separating end portions of these layers and extending from an end of the narrow-width cord layer toward the outside of the tire, and the space cushion rubber is a rubber composite comprised of an inner rubber extending so as to separate the end portions of the layer from each other and an outer rubber extending from the inner rubber toward the outside of the tire and having at least two different rubber compositions, and 100% moduli Mx', M6$i$ and M6$u$ (kgf/cm$^2$) of a coating rubber for the narrow-width outer cord layer, inner rubber (6$i$) and outer rubber (6$u$) establish a relationship of M6$u$<M6$i$≦Mx'.

When the space cushion rubber is comprised of two rubbers, the position of joint face between the inner rubber 6$i$ and the outer rubber 6$u$ may be located on either an end of the narrow-width cord layer or an end of the end cover rubber provided on the end portion of the layer as a standard point or may be within a region slightly separated from the above standard point toward the inside or outside of the tire.

According to a fifth aspect of the invention, there is the provision of a heavy duty pneumatic radial tire comprising a radial carcass toroidally extending between a pair of bead cores embedded in a pair of bead portions and a belt superimposed about an outer periphery of the carcass to reinforce a tread portion and comprised of at least three rubberized cord layers, cords of two adjacent layers among these layers being crossed with each other at an acute cord angle with respect to an equatorial plane of the tire to form cross cord layers, in which an outer cord layer of the cross cord layers in a radial direction of the tire has a width narrower than that of an inner cord layer, and such a narrow-width cord layer is provided with a space rubber covering an outer peripheral surface side of an end portion of the layer and projecting outward from the end of the layer in the widthwise direction thereof, and an inner peripheral surface of the projected space rubber is located outward from an extrapolated extending surface of the outer peripheral surface of the narrow-width cord layer in the radial direction of the tire, and the space rubber has a 100% modulus larger than that of a coating rubber for the narrow-width cord layer.

If the end cover rubber is not provided on the end portion of the narrow-width cord layer, the space rubber is arranged so as to directly contact with the end portion, while if the end cover rubber is provided on the end portion of the layer, the space rubber is arranged so as to directly contact with the outer periphery of the end cover rubber to separate the end portion from a tread rubber. The space rubber is a flat sheet having a taper on its end portion and may be triangular or trapezoidal in section, if necessary.

According to a sixth aspect of the invention, there is the provision of a heavy duty pneumatic radial tire comprising a radial carcass toroidally extending between a pair of bead cores embedded in a pair of bead portions and a belt superimposed about an outer periphery of the carcass to reinforce a tread portion and comprised of at least three rubberized cord layers, cords of two adjacent layers among these layers being crossed with each other at an acute cord angle with respect to an equatorial plane of the tire to form cross cord layers, in which the cross cord layers are provided with a side space rubber extending between ends of these layers located at the same side, and the side space rubber has a 100% modulus smaller than that of a coating rubber for the cross cord layers.

The side space rubber serves to separate the ends of the cross cord layers from a tread rubber likewise the aforementioned space rubber covering the outer peripheral surface side of the end portion of the narrow-width cord layer. Therefore, it is required that an inner portion of the side space rubber in the radial direction of the tire covers the end of the inner cord layer among the cross cord layers, so that it is desirable to arrange the side space rubber to extend over the end of the inner cord layer.

According to a seventh aspect of the invention, there is the provision of a heavy duty pneumatic radial tire comprising a radial carcass toroidally extending between a pair of bead cores embedded in a pair of bead portions and a belt superised about an outer periphery of the carcass to reinforce a tread portion and comprised of at least three rubberized cord layers, cords of two adjacent layers among these layers being crossed with each other at an acute cord angle with respect to an equatorial plane of the tire to form cross cord layers, in which an outer cord layer of the cross cord layers in a radial direction of the tire has a width narrower than that of an inner cord layer, and at least a coating rubber for such a narrow-width cord layer among the cord layers constituting the belt extends over an end of the cord in this layer toward the outside of the tire, and a distance from the end of the cord to an outer end of the coating rubber is within a range of 0.05–0.70 mm.

In general, cords in the cord layer constituting the belt slightly protrude from the coating rubber at an unvulcanized state and the cord layer is built up into an unvulcanized tire at such a state, which is then vulcanized to prepare a product tire in which the ends of the cords are maintained at a state of slightly protruding from the coating rubber. On the contrary, the tire of the seventh aspect is characterized by surely and completely enveloping the cord end with the coating rubber as compared with the above conventional tire, which develops the effect of attaining the object of the invention. It is desirable that the distance from the end of the cord to the outer end of the coating rubber is within a range of 0.10–0.50 mm.

The first to seventh aspects develop the effect of attaining the object of the invention individually, but may be adequately and freely combined in accordance with the severity of service conditions.

In order to favorably support the effect of attaining the object of the invention, it is desirable that a belt under-cushion rubber is disposed between the carcass and an end portion of the cord layer located close to the carcass and has a 1000% modulus corresponding to 0.3–0.7 times the 100% modulus of a coating rubber for this cord layer, or that either organic fiber cord or steel cord is applied to the narrow-width cord layer among the cross cord layers and the distance between the cords in a given end count is unequal.

BRIEF DESCRIPTION OF THE DRAWINGS

The invention will be described with reference to the accompanying drawings, wherein:

FIG. 11 is a partly developed view illustrating a group of cords arranged in another narrow-width cord layer;

FIG. 12 is a partly schematic section view perpendicular to a direction of arranging cords in the narrow-width cord layer;

FIGS. 13(a) and 13(b) are each a schematic view illustrating a shearing strain acting to cord ends;

FIG. 14 is a graph showing a relation among crack length, rolling resistance and modulus ratio; and FIG. 15 is a schematic view illustrating cracks created at a cord end portion of a narrow-width cord layer.

DESCRIPTION OF THE PREFERRED EMBODIMENTS

In the embodiments of FIGS. 1, 4, 5 and 7–10 showing left-half sections of their main parts with respect to an equatorial plane E of the tire, a radial carcass 1 toroidally extends between a pair of bead cores (not shown) embedded in a pair of bead portions (not shown) and is provided on its outer periphery with a belt 3 reinforcing a tread portion 2. Moreover, a tread rubber 2t shown in each of the above embodiments has a two-layer structure of a cap rubber 2tc and a base rubber 2tb.

The belt 3 is comprised of at least three rubberized cord layers. In the illustrated embodiments, the belt 3 is comprised of four rubberized cord layers 3-1, 3-2, 3-3 and 3-4 viewed from the side of the radial carcass 1 in order. Among these cord layers 3-1 to 3-4, two adjoining cord layers 3-2 and 3-3 form cross cord layers in which cords of the two layers are crossed with each other at an acute angle of not more than 90° defined between the cords of the layers with respect to the equatorial plane E of the tire. The cross cord angle is preferably within a range of 30–500 in order to satisfactorily develop the function of the belt 3. In other words, it is desirable that the cords in each of the cross cord layers 3-2 and 3-3 are inclined at an angle of 15–25° with respect to the equatorial plane E. Although one set of the cross cord layers is existent in each of the above embodiments, the belt 3 may include two or more sets of the cross cord layers.

As to the belt 3 having the above structure, the width of the cord layer 3-3 located outward in the radial direction of the tire among the cross cord layers 3-2 and 3-3 is narrower than that of the cord layer 3-2, so that ends of the cross cord layers 3-2 and 3-3 form a step difference as sectionally shown in each drawing. Moreover, the width of each of the cord layers constituting the belt is substantially divided into equal parts with respect to the equatorial plane E.

The invention will be described below with reference to the embodiments of FIGS. 1–4.

Figure 1:
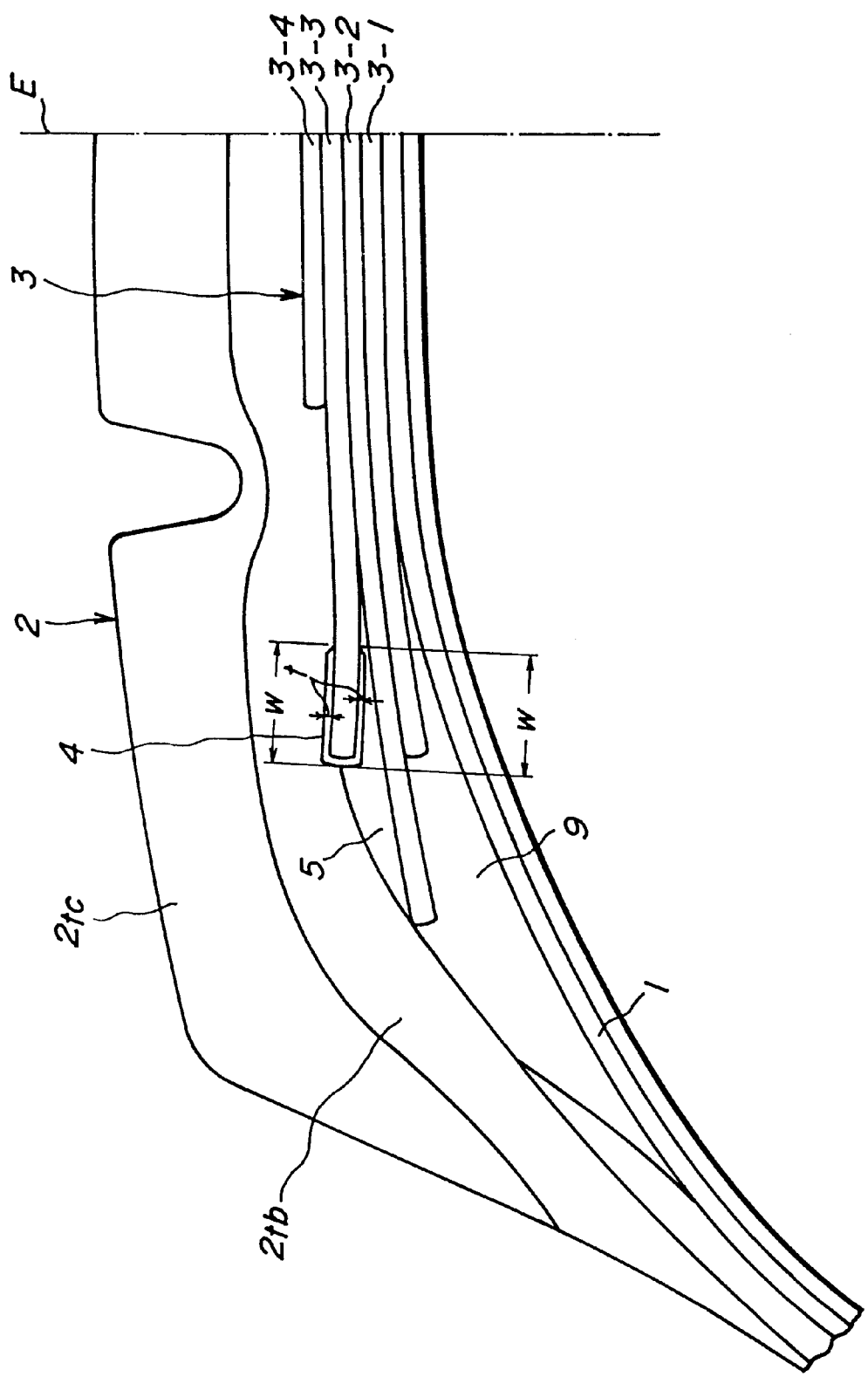
FIG. 1 is a left-half section view of a main part of a first embodiment of the heavy duty pneumatic radial tire according to the invention.
Figure 2:
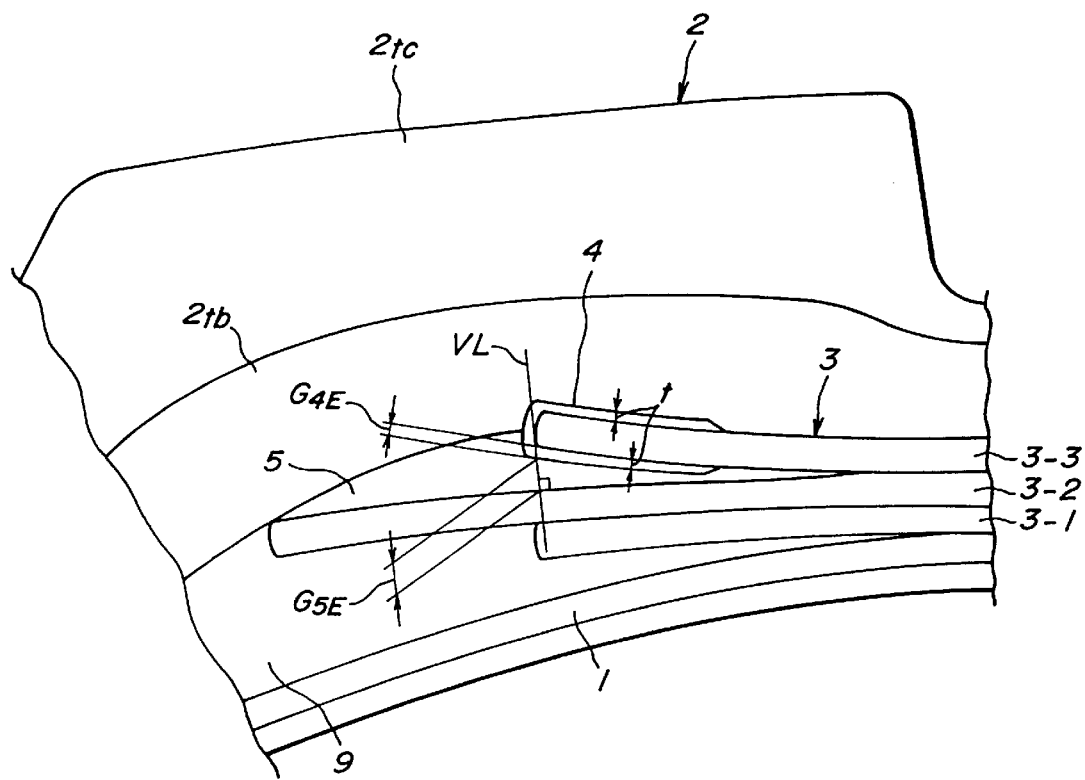
FIG. 2 is a partly enlarged view of the main part shown in FIG. 1.

In FIGS. 1 and 2, the narrow-width cord layer 3-3 is provided with an end cover rubber 4 covering the end portion of the layer. The end cover rubber 4 shown in FIGS. 1 and 2 covers the end portion of the layer 3-3 over a region ranging from an inner surface in the radial direction of the tire through the end to an outer surface thereof On the other hand, the end cover rubber 4 shown in FIG. 4 covers only the inner surface of the end portion in the radial direction.

The end cover rubber 4 is necessary to have a 100% modulus $M_4$ (kgf/cm$^2$) larger than a 100% modulus Mx' of a coating rubber for the narrow-width cord layer 3-3. Concretely, it is desirable that the 100% modulus $M_4$ is within a range of 1.2–4.0 times the 100% modulus Mx' of the coating rubber for the narrow-width cord layer.

In each of the above embodiments, the cross cord layers 3-2 and 3-3 are provided with a space cushion rubber 5 separating end portions of these layers from each other exceeding a thickness t of the end cover rubber 4. The space cushion rubber 5 is necessary to have a 100% modulus $M_5$ smaller than a 100% modulus Mx of a coating rubber for the cross cord layers 3-2 and 3-3. Concretely, it is desirable that the 100% modulus $M_5$ is within a range of not more than 0.95 times, preferably 0.5–0.9 times the 100% modulus Mx of the coating rubber for the cross cord layers 3-2 and 3-3. Moreover, if the belt includes two or more sets of the cross cord layers, the end cover rubber 4 and the space cushion rubber 5 are applied to a narrow-width cord layer having at least a maximum width among the narrow-width cord layers.

Referring to FIG. 2, it is advantageous that the 100% modulus $M_5$ of the space cushion rubber 5 satisfies a relationship of $M_5 \leq Mx - (M_4 - Mx) \times (G_{4E}/G_{5E})$ with respect to inner gauge $G_{4E}$ of the end cover rubber 4 at the end of the narrow-width cord layer 3-3 in the radial direction, a gauge $G_{5E}$ of the space cushion rubber 5 existing on a vertical line VL drawn from the end of the layer 3-3 to the inner cord layer 3-2 in the cross cord layers, 100% modulus $M_4$ of the end cover rubber 4 and 100% modulus Mx of the coating rubber for the cross cord layers 3-2 and 3-3.

Figure 3:
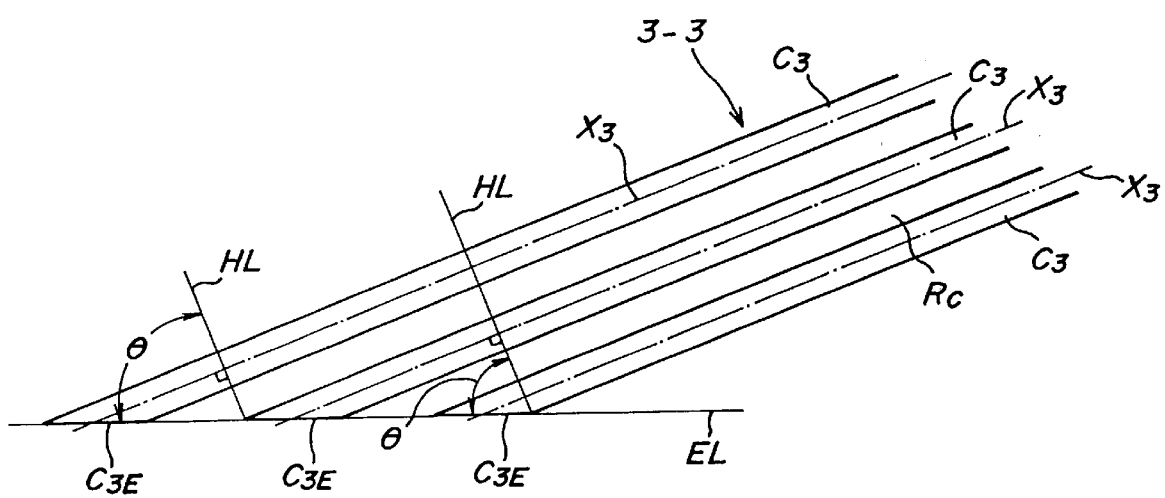
FIG. 3 is a partly developed perspective view illustrating a group of cords arranged in a narrow-width cord layer.

Referring to FIG. 3, both corners of each cord end $C_{3E}$ in a group of cords $C_3$ (only three cords show in FIG. 3) arranged in the narrow-width cord layer 3-3 form an obtuse angle and an acute angle in its developed plane view, and each cord end $C_{3E}$ substantially locates on a straight line EL. It is desirable that the width w of the end cover rubber 4 satisfies a relationship of $w \geq (50 \text{ mm/N}) \times \sin \theta$ with respect to an inclination angle θ defined between a normal line HL drawn from any one corner of a cord end $C_{3E}$ of a certain cord $C_3$ to a center axis line $X_3$ of another cord $C_3$ adjacent thereto and the straight line EL and an end count N of cords $C_3$ per 50 mm as measured in a direction of the normal line HL. However, the end of the end cover rubber 4 having the width w inside the tire is terminated in a region of arranging the space cushion rubber 5. Moreover, symbol Rc is a coating rubber for the cord $C_3$ in the narrow-width cord layer 3-3.

The invention will be described below with reference to the embodiments of FIGS. 5 and 6.

Figure 5:
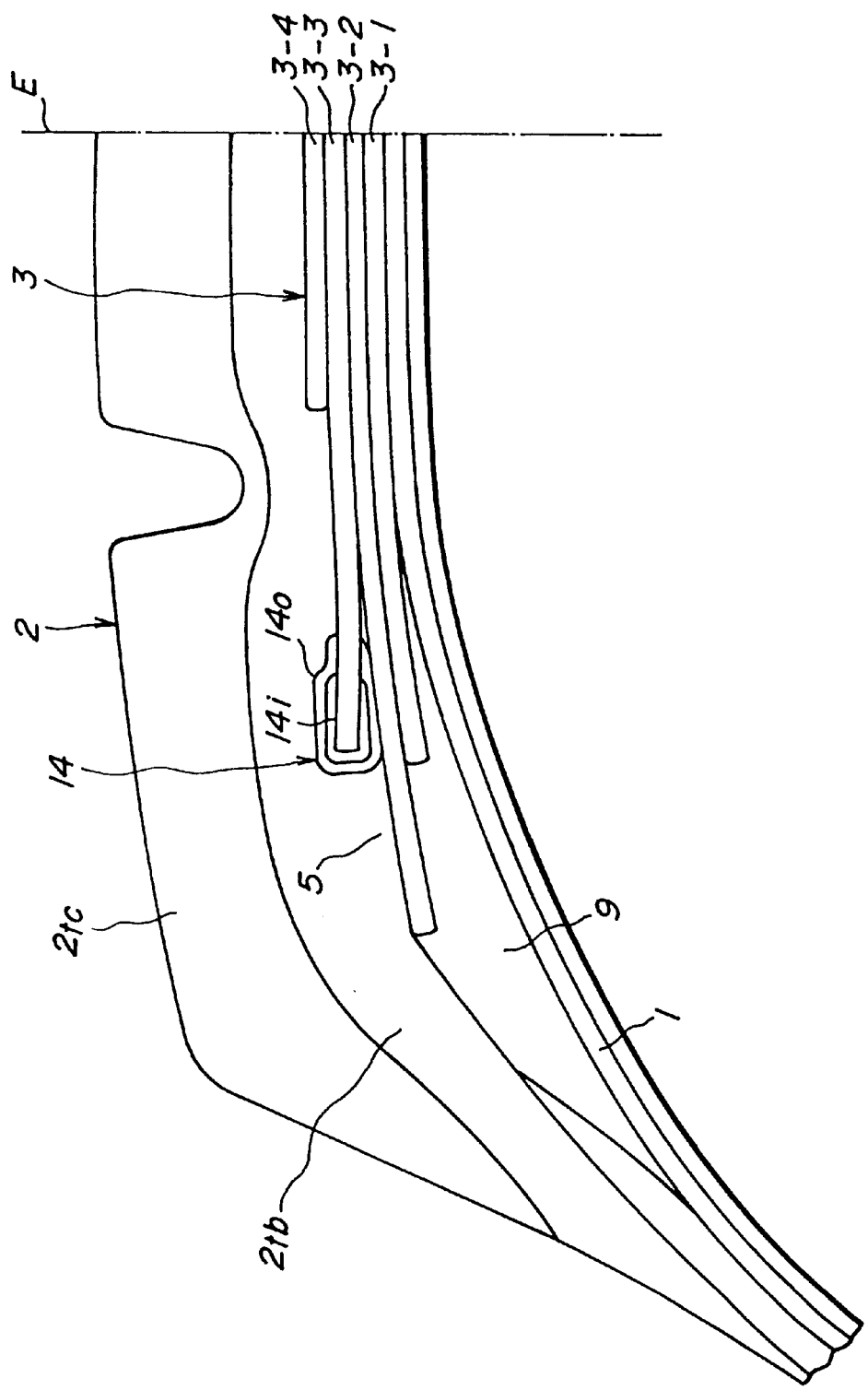
FIG. 5 is a left-half section view of a main part of a third embodiment of the heavy duty pneumatic radial tire according to the invention.

In the embodiment of FIG. 5, the end portion of the narrow-width cord layer 3-3 is covered with a double end cover rubber 14 comprised of an inner end cover rubber 14i and an outer end cover rubber 14o having different rubber compositions. In this case, the outer end cover rubber 14o has a 100% modulus $M_{14o}$ larger than a 100% modulus $M_{14i}$ of the inner end cover rubber 14i. In fact, both moduli satisfy $M_{14o} = (1.2-4.0) \times M_{14i}$. Furthermore, the relationship of the aforementioned width w is applicable to a maximum width $w_{max}$ of the double end cover rubber 14.

Although the space cushion rubber is not arranged in the embodiment of FIG. 5, a stress-releasing rubber may be arranged likewise the case of FIG. 1. Moreover, it is desirable that the 100% moduli $M_{14i}$ and $M_{14o}$ of the inner and outer end cover rubbers and 100% modulus Mx of the coating rubber for the cross cord layers 3-2 and 3-3 satisfy a relationship of $(M_{14i}/Mx) = 1.0-1.3$ within a range of $(M_{14o}/M_{14i}) = 1.2-4.0$.

Figure 6:
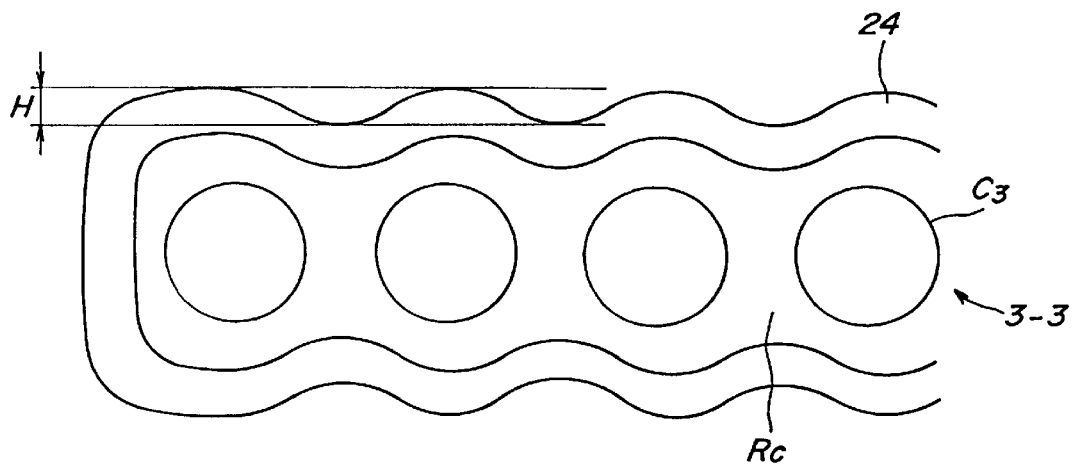
FIG. 6 is an enlargedly schematic section view in a direction perpendicular to cords arranged in an end portion of the narrow-width cord layer.

FIG. 6 enlargedly shown a section of the end portion of the narrow-width cord layer 3-3 in a direction perpendicular to the cords $C_3$ of this layer. As seen from FIG. 6, an end cover rubber 24 forms a wave at least at one of inner and outer sides in the radial direction (both sides in the illustrated embodiment). A height H between bottom and peak of the wavy form is within a range of 0.05–0.25 mm, preferably 0.07–0.20 mm. This peculiar wave can be formed by pressing a rubberized uncured cord layer from both sides thereof by means of a comb roll similar to a comb roll for aligning many cords just before the coating with rubber in the production of an uncured starting member for the narrow-width cord layer through a calender roll, or by thinning a gauge of an uncured coating rubber as far as possible. In the latter method, however, the gauge of the coating rubber is too thin and hence the cord may be exposed from the coating rubber to cause an adhesion breakage in the exposed cord portion, so that the gauge of the coating rubber should be restricted to an extent that the cord is not exposed from the coating rubber.

The invention will be described below with reference to the embodiments of FIGS. 7–10.

Figure 7:
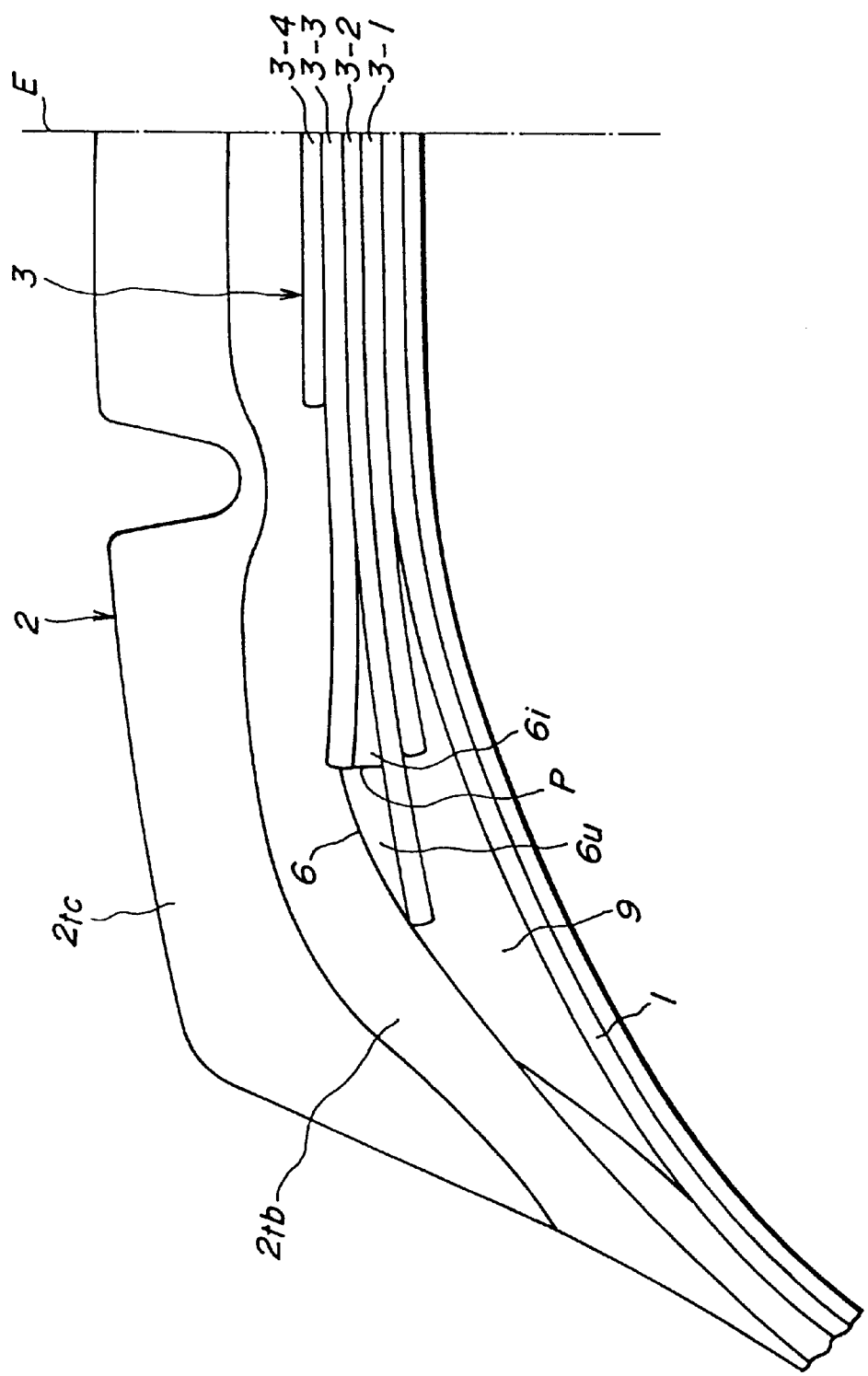
FIG. 7 is a left-half section view of a main part of a fourth embodiment of the heavy duty pneumatic radial tire according to the invention.

A space cushion rubber 6 shown in FIG. 7 separates the end portions of the cross cord layers 3-2 and 3-3 from each other and extends from the end of the narrow-width cord layer 3-3 toward the outside of the tire likewise the case of FIG. 1. However, the space cushion rubber 6 is a rubber coosite comprised of an inner rubber 6i for separating the end portions of the cross cord layers 3-2 and 3-3 from each other and an outer rubber 6u extending from the inner rubber 6i toward the outside of the tire and having at least two different rubber compositions, which is entirely different from the case of FIG. 1.

Even when the end cover rubber is applied to the narrow-width cord layer, the inner rubber 6i and outer rubber 6u always satisfy the above position relation. When 100% moduli of the inner rubber 6i and the outer rubber 6u are M6i and M6u, it is necessary that the 100% moduli M6i and M6u and 100% modulus Mx' of the coating rubber for the narrow-width cord layer 3-3 satisfy a relationship of M6u<M6i≦Mx'. In fact, it is preferable that (M6u/M6i) is within a range of 0.5–0.9 and (M6i/Mx') is within a range of 0.9–1.0. Moreover, a partition face P between the inner rubber 6i and the outer rubber 6u may be inclined inward or outward from the illustrated position.

Figure 8:
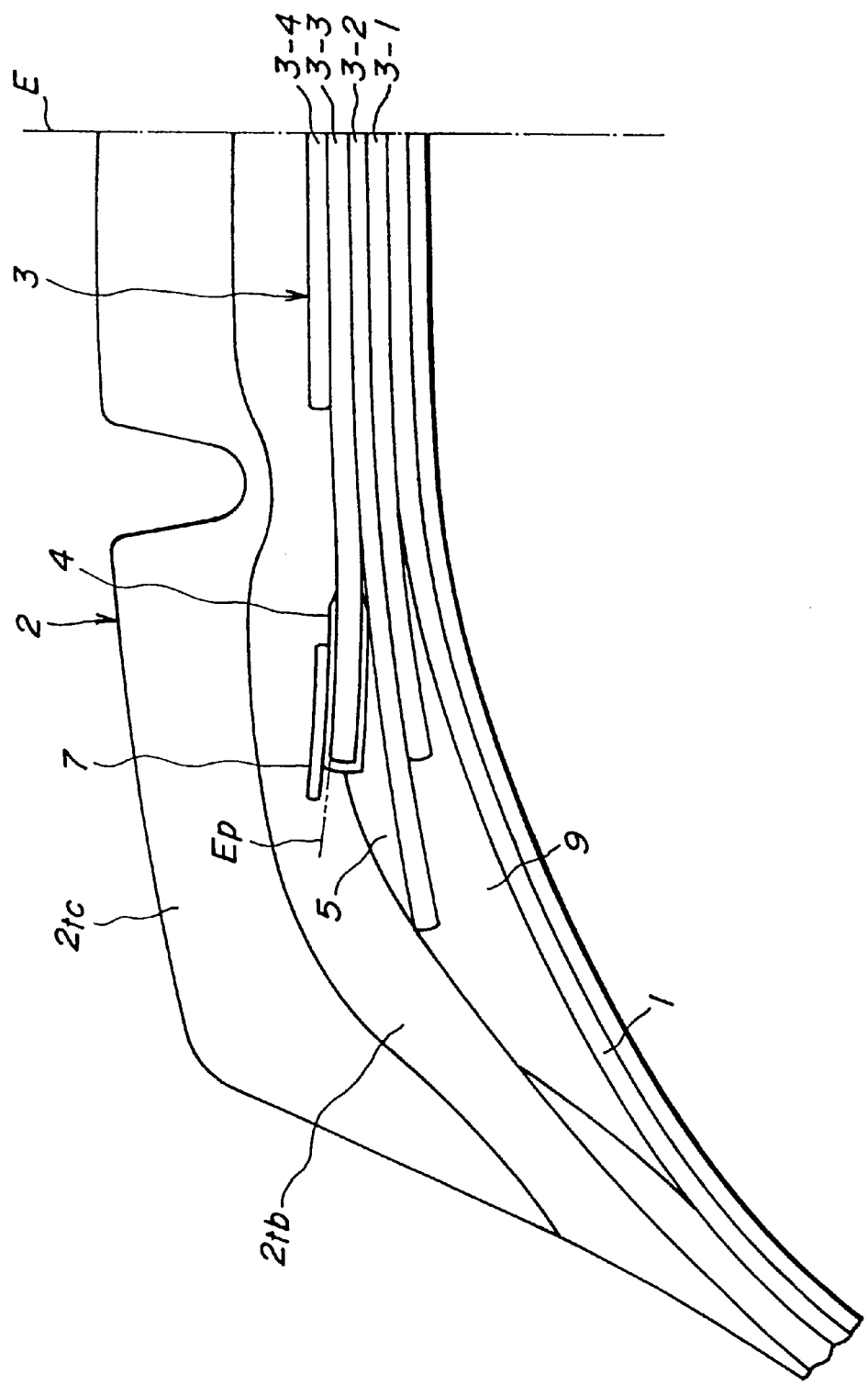
FIG. 8 is a left-half section view of a main part of a fifth embodiment of the heavy duty pneumatic radial tire according to the invention.

In the embodiment of FIG. 8, the narrow-width cord layer 3-3 is provided with a space rubber 7 covering the end portion of this layer from its outer periphery side, which is arranged to project outward from the end of the narrow-width cord layer 3-3 in the widthwise direction of the belt 3. In this case, however, the projected portion of the space rubber is located outward in the radial direction from an extrapolated extending surface Ep of an outer surface of the narrow-width cord layer 3-3 extended outward at a given curvature in the widthwise direction of the belt 3.

Although the end cover rubber 4 and the space cushion rubber 5 are arranged together in the embodiment of FIG. 8, only the space rubber 7 may be arranged to directly contact with the surface of the end portion of the narrow-width cord layer 3-3 without the arrangement of the rubbers 4 and 5. Moreover, the space rubber 7 is required to have a 100% modulus $M_7$ larger than the 100% modulus Mx' of the coating rubber for the narrow-width cord layer 3-3. Concretely, it is desirable that the 100% modulus $M_7$ is within a range of 1.2–4.0 times the 100% modulus Mx'.

Figure 9:
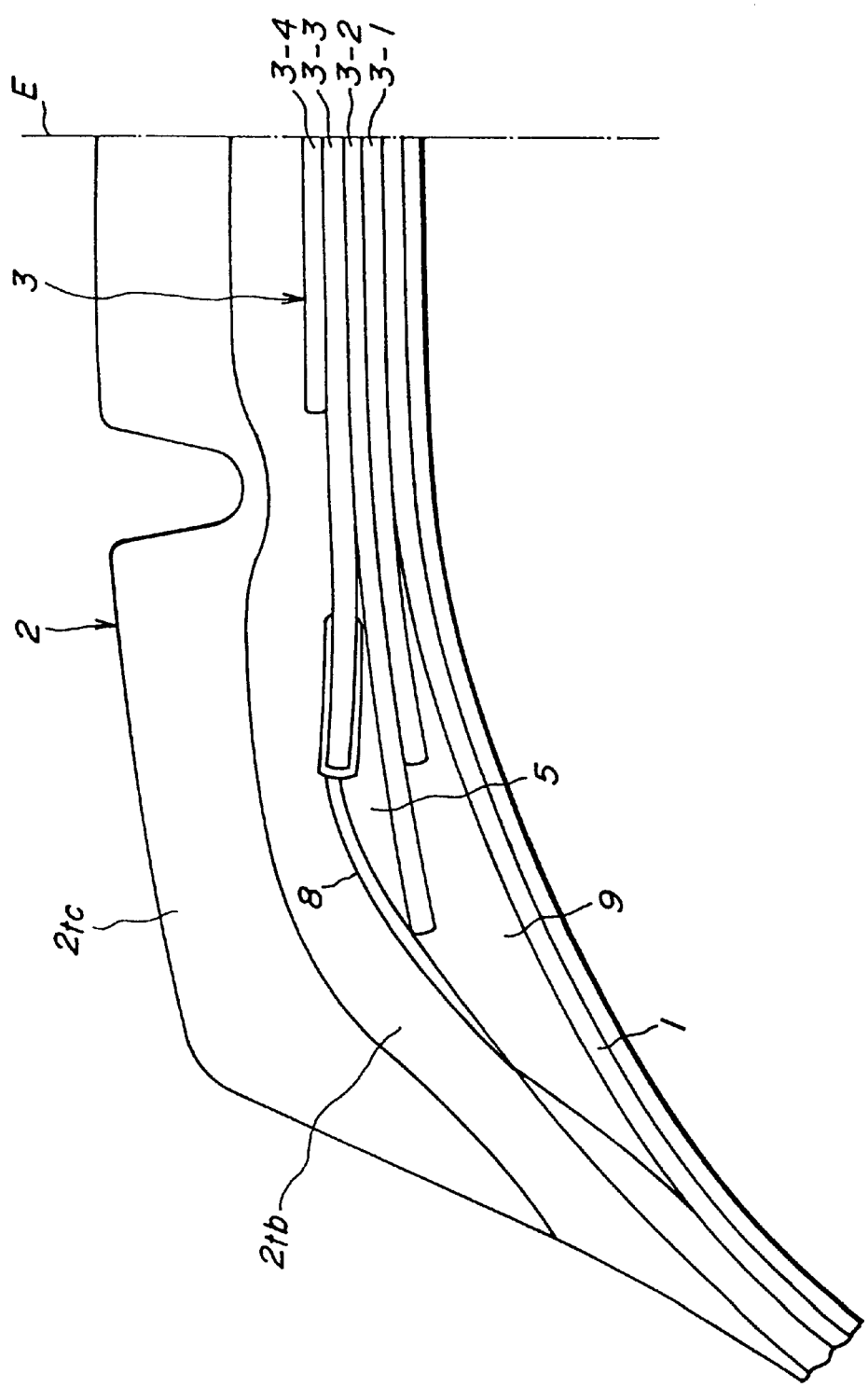
FIG. 9 is a left-half section view of a main part of a sixth embodiment of the heavy duty pneumatic radial tire according to the invention

In the embodiment of FIG. 9, the cross cord layers 3-2 and 3-3 are provided with a side space rubber 8 extending between the ends of these layers in addition to the end cover rubber 4 and the space cushion rubber 5. In the illustrated embodiment, the side space rubber 8 extends inward over an end of the cord layer 3-2 in the radial direction of the tire. The side space rubber 8 has necessarily a 100% modulus $M_8$ smaller than the 100% modulus Mx of the coating rubber for the cross cord layers 3-2 and 3-3. Concretely, it is desirable that the 100% modulus $M_8$ is within a range of 0.5–0.9 times the 100% modulus Mx. Moreover, only the side space rubber 8 may be applied to the ends of the cross cord layers 3-2 and 3-3 without the arrangement of the rubbers 4 and 5 likewise the case of FIG. 8.

Figure 10:
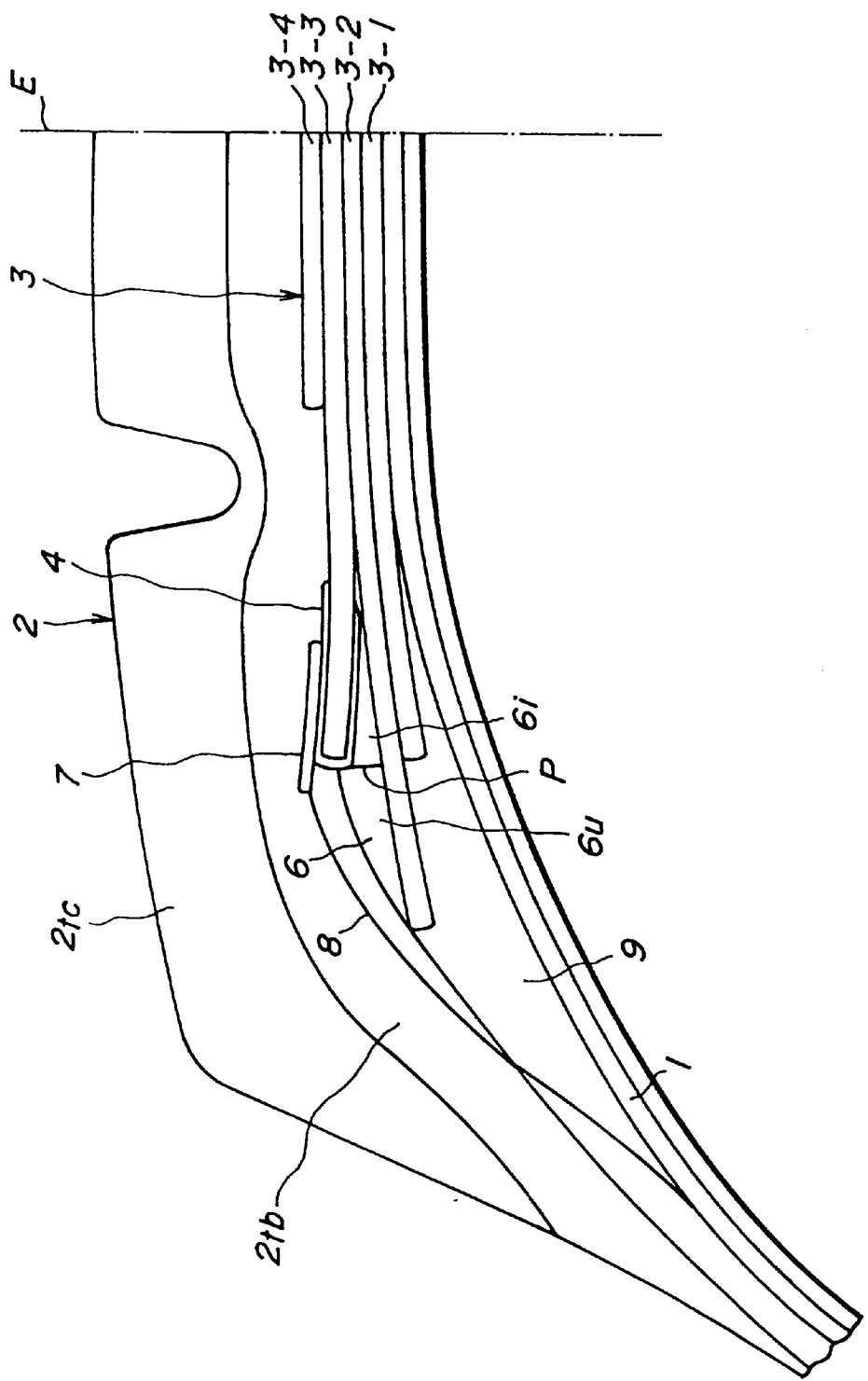
FIG. 10 is a left-half section view of a main part of a seventh embodiment of the heavy duty pneumatic radial tire according to the invention.

The embodiments of FIGS. 1–9 are effective to attain the object of the invention individually or under a dependent relation thereto, but they may be freely combined in accordance with the severity of service conditions. An example of such a combination is shown in FIG. 10. In the tire of FIG. 10, the end cover rubber 4 is provided on the narrow-width cord layer 3-3, and the rubber composite comprised of the inner rubber 6i and the outer rubber 6u is provided as the space cushion rubber 6 arranged between the end portions of the cross cord layers 3-2 and 3-3, and the space rubber 7 is provided on the outer surface of the end cover rubber 4 in the radial direction, and the side space rubber 8 is arranged so as to extend between the ends of the cross cord layers 3-2 and 3-3.

FIG. 11 is a partly developed view of an end portion of a narrow-width cord layer 3-3 shown in accordance with FIG. 3, in which cord ends $C_{3E}$ in a group of cords $C_3$ (shown by dotted lines) arranged in the layer are existent substantially on a straight line EL and a coating rubber Rc for the cord $C_3$ extends over each cord end $C_{3E}$ to an end 3-3e. It is required that a distance from the cord end $C_{3E}$ to the end 3-3e is within a range of 0.05–0.70 nm, desirably 0.10–0.50 nm. In this case, the application of the end cover rubbers 4, 14 and 24 is not always required. If such rubbers are applied, it is desirable to apply a rubber having the same rubber composition as the coating rubber for the narrow-width cord layer in view of the productivity instead of the aforementioned end cover rubbers 4, 14 and 24.

In the tires comprising the cross cord layers 3-2 and 3-3 in common with FIGS. 1–11, it is desirable that a belt under-cushion rubber 9 is arranged between the carcass 1 and the end portion of the cord layer 3-1 in the belt 3 located nearest to the carcass 1. In this case, it is favorable that a 100% modulus $M_9$ of the rubber 9 is within a range of 0.3–0.7 times the 100% modulus Mx" of a coating rubber for the cord layer 3-1. Moreover, a mutual relation of 100% modulus in coating rubbers for the cord layers 3-1 to 3-3 constituting the belt 3 may be Mx"=Mx'=Mx or Mx"≈Mx'≈Mx.

Further, it is favorable to use steel cords or organic fiber cords such as aramide fiber cords or the like as a cord in the narrow-width cord layer. In this case, it is desirable that the cords $C_3$ are arranged at unequal distances as a section perpendicular to a direction of arranging the cords is shown in FIG. 12.

It is well-known that the growing rate of crack liable to be created at the end portion of the narrow-width cord layer 3-3 in the cross cord layers 3-2 and 3-3 is depended by two kinds of shearing strains produced through deformation at ground contact. Among these strains, a first strain is a shearing strain $\gamma_{st}$ acting between the cord and the coating rubber along the direction of arranging the cords at a "pecking" stage created at the cord end. As a result, the crack grows in the coating rubber surrounding the cord along the direction of arranging the cords.

A second strain is an interlaminar shearing strain $\gamma_{23}$ acting between the end portion of the narrow-width cord layer 3-3 and the cord layer 3-2 in the vicinity of the end $C_{3E}$ of the cord $C_3$. The interlaminar shearing strain $\gamma_{23}$ mainly grows the crack along the cord to cause interlaminar separation and then controls the growing rate of the interlaminar separation. The behaviors of these shearing strains $\gamma_{st}$ and $\gamma_{23}$ are illustrated in FIGS. 13(a) and (b). FIG. 13(a) is a perspective view schematically showing only cords $C_2$, $C_3$ taken out from the end portions of the cross cord layers 3-2 and 3-3, while FIG. 13(b) is a plan view of cords $C_2$ and $C_3$.

As shown in FIG. 13(b), the shearing strain $\gamma_{st}$ is dependent on the in-plane shearing strain LC of rubber located close to the end of the cord layer 3-3. In order to control the crack growth and prevent the occurrence of separation failure, therefore, it is necessary to simultaneously reduce the interlaminar shearing strain $\gamma_{23}$ and the in-plane shearing strain LC. Now, the reduction of both shearing strains $\gamma_{23}$ and LC will be described below.

First, there are mentioned the following conclusions:

(1) If the 100% modulus $M_4$ of the end cover rubber 4 is set to be larger than 100% modulus Mx' of the coating rubber for the cord layer 3-3, the shearing strain LC tends to decrease and the interlaminar shearing strain $\gamma_{23}$ tends to increase;

(2) If the 100% modulus $M_5$ of the space cushion rubber 5 at least located outward from the end of the cord layer 3-3 is set to be smaller than the 100% modulus Mx' of the coating rubber for the cord layer 3-3, both the shearing strain LC and interlinar shearing strain $\gamma_{23}$ tend to decrease;

(3) If the 100% modulus M6u of the outer rubber 6u is set so as to be smaller than the 100% modulus Mx' of the coating rubber for the cord layer 3-3, the shearing strain LC decreases without increasing or decreasing the interlaminar shearing strain $\gamma_{23}$;

(4) If the 100% modulus $M_7$ of the projected space rubber 7 is set to be larger than the 100% modulus Mx' of the coating rubber for the cord layer 3-3, the shearing strain LC decreases without increasing or decreasing the interlaminar shearing strain $\gamma_{23}$;

(5) If the 100% modulus $M_8$ of the side space rubber 8 is set to be smaller than the 100% modulus Mx of the coating rubber for the cross cord layers 3-2 and 3-3, the shearing strain LC tends to decrease and the interlaminar shearing strain $\gamma_{23}$ tends so as not to increase;

(6) If the 100% modulus $M_9$ of the belt under-cushion rubber 9 is within a range of 0.3–0.7 times the 100%. modulus Mx" of the coating rubber for the cord layer 3-1, both the shearing strain LC and the interlaminar shearing strain $\gamma_{23}$ tend to decrease.

The above items (1)–(6) develop the effect individually, but the increase tendency of the interlaminar shearing strain $\gamma_{23}$ in the item (1) is undesirable, so that it is required to combine the item (1) with the item (2). In such a combination, if the 100% modulus $M_4$ is not less than 1.2×Mx' and the 100% modulus $M_5$ is not more than 0.95×Mx', it is possible to control the increase tendency of the interlaminar shearing strain $\gamma_{23}$ and further control the shearing strain LC.

Further, the combination of the items (1) and (2) contributes to not only the decrease of the shearing strain LC but also the effective control of the interlaminar shearing strain $\gamma_{23}$ if the 100% moduli $M_4$, $M_5$ and Mx and the gauge $G_{4E}$ of the end cover rubber 4 and the gauge $G_{5E}$ of the space cushion rubber 5 are adequately set so as to establish a relationship of $M_5 \leq Mx-(M_4-Mx)\times(G_{4E}/G_{5E})$.

As to the decrease of the in-plane shearing strain LC in the above items (1)–(6), the following are mainly supplemented.

In items (1) and (4), the effect of controlling the in-plane deformation of rubber located close to the end of the cord layer 3-3 is obtained by covering the end portion of the cord layer 3-3 with a high-modulus rubber or by covering the end portion from the outside in the radial direction with such a rubber. The strain of rubber between the cord layers 3-2 and 3-3 in-the item (2), the shearing strain LC and -interlaminar shearing strain $\gamma_{23}$ are decreased by setting the 100% modulus $M_5$ of the space cushion rubber 5 to a smaller value. Particularly, item (3) develops the effect of absorbing strain through displacement of step portion of the cord layer 3-2 (step-difference portion to the cord layer 3-3) because the 100% modulus M6u of the outer rubber 6u is lower than the 100% modulus Mx' of the coating rubber for the cord layer 3-3. In item (5), considering the distribution of the shearing strain LC of rubber located close to the end of the cord layer 3-3, the 100% modulus $M_8$ of the side space rubber 8 is small, so that the shearing strain LC concentrates in the side space rubber 8 and hence there is developed the effect of mitigating the shearing strain LC of rubber located close to the end of the cord layer 3-3.

In item (6), the 100% modulus $M_9$ of the belt under-cushion rubber 9 is large, so that the rigidity between the carcass 1 and the cord layer 3-1 increases and hence the tension-bearing of the cross cord layers 3-2 and 3-3 is decreased by such an increment of the rigidity and the relative displacement of each cord layer in the circumferential direction under loading is reduced to decrease both the shearing strain LC and the interlaminar shearing strain $\gamma_{23}$. The energy loss through the shearing strain between the carcass 1 and the cord layer 3-1 increases, which can not be ignored because the volume of the belt under-cushion rubber 9 occupied is large. This is in a direction opposite to a recent demand of more reducing fuel consumption, so that it is favorable that the 100% modulus $M_9$ is within a range of 0.3–0.7 times the 100% modulus Mx" as shown in FIG. 14 in order to take a balance between strain and low fuel consumption (low rolling resistance).

In FIG. 14, an abscissa is a value of modulus ratio $M_9$/Mx", and a left ordinate is a value (index) of crack length $K_L$, and a right ordinate is a value (index) of rolling resistance R.R. As seen from FIG. 14, the crack length $K_L$ and the rolling resistance R.R are a in conflicting relationship.

As to the shearing strain $\gamma_{23}$, there will mainly be described the significance on the division of the space cushion rubber 6 deeply participating in the shearing strain $\gamma_{23}$ into the outer rubber 6u and the inner rubber 6i below.

When the end cover rubber 4 is applied at a larger value of 100% modulus $M_4$, even if interlaminar separation is created, the shearing strain $\gamma_{23}$ in the end cover rubber 4 is smaller than the shearing strain $\gamma_{23}$ in the coating rubber for the cord layer 3-3, so that the interlaminar separation does never arrive at the space cushion rubber 5.

However, if it is required to reduce the number of constitutional members, or if it is difficult to use an end cover rubber 4 having a higher modulus in view of the productivity, there is adopted the space cushion rubber 5. Even if the 100% modulus $M_5$ of the space cushion rubber 5 is a small value, the shearing strain $\gamma_{23}$" in the space cushion rubber 5 becomes larger while the shearing strain $\gamma_{23}$ created in the end portion of the cord layer 3-3 is reduced. As a result, there is not particularly caused a serious trouble while the crack at "pecking" stage progresses in the coating rubber along the cord, but once such a crack grows to the interlaminar separation, this separation rapidly grows in the space cushion rubber 5 to cause trouble. Therefore, when the end cover rubber 4 having a large 100% modulus $M_4$ is not used, it is necessary to take the following countermeasure after the occurrence of the interlaminar separation.

As a favorable countermeasure, the space cushion rubber 6 is divided into the outer rubber 6u and the inner rubber 6i so that the 100% moduli of these rubbers satisfy the relationship of M6$u$<M6$i$≦Mx', whereby the 100% modulus of that portion of the space cushion rubber 6 (inner rubber 6$i$) arriving in the interlaminar separation is not lowered too much and the 100% modulus of the outer rubber 6$u$ is made smaller than that of the inner rubber to decrease the in-plane shearing strain LC and the shearing strain $\gamma_{23}$.

The control and reduction of the shearing strain $\gamma_{23}$ itself will be described below.

Referring to FIG. 15 showing a group of cords $C_3$ as a developed view similar to FIG. 3, cracks K created in the vicinity of each end $C_{3E}$ of the cords $C_3$ through the action of the shearing strain $\gamma_{st}$ frequently grow to a series of cracks K as the running of the tire proceeds. In this case, the position of the cracks K connecting between the mutual adjoining cords $C_3$ tends to substantially match with a course of arriving a normal line HL drawn from an obtuse corner of the end $C_{3E}$ of the cord $C_3$ in the another adjoining cord $C_3$ even if the above position is located close to the outside of the tire.

A distance $w_m$ between the straight line EL and a straight line WL (on a developed view) connecting ends of the connected course of the cracks K between the mutual adjoining cords $C_3$ is a minimum width w of the end cover rubber 4, so that when the width w of the end cover rubber 4 is set to not less than (50 mm/N)×sin θ, the growing region of the crack K brought by the shearing strain $\gamma_{st}$ is rendered into a reducing region of the shearing strain $\gamma_{st}$, whereby the growth of the crack K can be controlled.

When the wave is formed on at least one side of the end cover rubber 24 in the radial direction (see FIG. 6)(both sides in the illustrated embodiment), or when the end cover rubber 24 is fallen down between the cords $C_3$ to render the height H between bottom and peak of the wavy surface into a range of 0.05–0.25 mm, preferably 0.07–0.20 mm, the effect of reducing the shearing strain $\gamma_{st}$ can effectively be developed.

Further, the coating rubber Rc for the cords $C_3$ arranged in the narrow-width cord layer 3-3 is extend to an end 3-3$e$ over the cord end $C_{3E}$ so as to render a distance y between the cord end $C_{3E}$ and the end 3-3$e$ into a range of 0.05–0.70 mn, desirably 0.10–0.50 mm (see FIG. 11) and the outer portion of the cord at its end $C_{3E}$ in the radial direction is covered with the coating rubber Rc having a relatively small value of 100% modulus, whereby the shearing strain $\gamma_{st}$ can be reduced and hence it is possible to simply and effectively control the crack K under a high productivity.

Finally, there is a relatively rare case that projection input is applied to the belt 3 of the tire running on bad road. In this case, the crack created at the end $C_{3E}$ of the cord $C_3$ in the narrow-width cord layer 3-3 shows a peculiar tendency of going away from the end $C_{3E}$ rather than along the direction of arranging the cords $C_3$, which is entirely different from the aforementioned occurrence and growth of the cracks.

The application of the end cover rubber 4 having the 100% modulus $M_4$ larger than 100% modulus Mx of the coating rubber Rc for the narrow-width cord layer 3-3 is disadvantageous to such a peculiar tendency. In this case, therefore, the double end cover rubber 14 is used in such a manner that the 100% modulus $M_{14i}$ of the inner end cover rubber 14$i$ is made smaller than the 100% modulus $M_{14o}$ of the outer end cover rubber 14$o$, whereby the rubber having a large 100% modulus promoting the growth of cracks such as the end cover rubber 4 is separated away from the end $C_{3E}$ of the cord $C_3$ to control the occurrence of cracks and at the same time delay the growing rate of cracks and hence the occurrence of separation failure can be controlled.

In addition to the aforementioned effects, the distance between the cords C3 embedded in the narrow-width cord layer 3-3 is made inequal as a whole, which contributes to reduce the shearing strain $\gamma_{st}$, in-plane shearing strain LC and interlaminar shearing strain $\gamma_{23}$ and serves to delay a time of connecting cracks K (running time).

The following examples are given in illustration of the invention and are not intended as limitations thereof.

There are provided radial ply tires for truck and bus having a tire size of 10.00R20 and a structure as shown in FIGS. 1–12, in which the carcass 1 is a single rubberized steel cord ply of radial arrangement, and the belt 3 is comprised of four rubberized layers each containing steel cords of 3×0.20+6×0.36 structure. In the belt 3, a first cord layer 3-1 has a width of 160 mm, a second cord layer 3-2 has a width of 185 mm, and a third cord layer 3-3 has a width of 160 mm, and a fourth cord layer 3-4 has a width of 80 mm, while a cord inclination angle of each cord layer with respect to the equatorial plane E of the tire is R52°, R18°, L18° and L18° in the order of the first to fourth layers (R means upward to the right, and L means upward to the left). Therefore, the cross cord layers are the second and third cord layers.

The, the invention is also applicable to the third and fourth cord layers in a case that the cord inclining directions of the first to fourth cord layers in the belt 3 are R, R, L and R in this order to form cross cord layers between the second and third cord layers and between the third and fourth cord layers and the widths of the cord layer is made narrower from the second cord layer to the fourth cord layer in order. Moreover, the cord inclining directions R, L may be replaced with each other.

The above tires having the common structure are divided into eight groups of from Group 1 to Group 8. The dimension and test results every group are shown in the respective Table. Moreover, a belt under-cushion rubber 9 having 100% modulus M9 of 23 kgf/cm² is applied to the Examples, Comparative examples and Conventional Example in each group, respectively.

In Group 1, there are manufactured tires of Examples 1–12 according to FIGS. 1–3 and Example 13 according to FIG. 12 together with tires of Comparative Examples 1–7 and the conventional tire. In the tire of Example 13, the cords of the cord layer 3-3 are divided into many bundles each containing three cords and the mutual bundles are separated apart from each other.

In all of the examples, Comparative Examples and Conventional Example, rubber having the same rubber composition and 100% modulus Mx is used as a coating rubber for the cord layers 3-1 to 3-4 constituting the belt. In each tire, the end count N per 50 mn of the narrow-width cord layer 3-3 is 24 cords and the inclination angle θ between the normal line HL of the cord $C_3$ and the straight line EL (see FIG. 3) is 72°, so that the value of (50 mm/N)×sin θ is 1.98. The values of 100% moduli, modulus ration, gauges $G_{4E}$ and $G_{5E}$, w and Mx−($M_4$−Mx)×($G_{4E}/G_{5E}$) in these examples are shown in Tables 1–3.

TABLE 1

| Items | | Conventional Example | \multicolumn{6}{c}{Examples} |
|---|---|---|---|---|---|---|---|---|
| | | | 1 | 2 | 3 | 4 | 5 | 6 |
| 100% Modulus (kgf/cm$^2$) | $M_x$ | 60 | 60 | 60 | 60 | 60 | 60 | 60 |
| | $M_4$ | 60 | 72 | 80 | 90 | 100 | 80 | 80 |
| | $M_5$ | 60 | 50 | 50 | 50 | 50 | 56 | 53 |
| Modulus ratio | $M_4/M_x$ | 1.00 | 1.20 | 1.33 | 1.50 | 1.67 | 1.33 | 1.33 |
| | $M_5/M_x$ | 1.00 | 0.83 | 0.83 | 0.83 | 0.83 | 0.93 | 0.88 |
| Gauge | $G_{4E}$ (mm) | 0.5 | 0.5 | 0.5 | 0.5 | 0.5 | 0.5 | 0.5 |
| | $G_{5E}$ (mm) | 2.5 | 2.5 | 2.5 | 2.5 | 2.5 | 2.5 | 2.5 |
| $M_4$-$(M_4-M_x)$ $(G_{4E}/G_{5E})$ | | 60 | 58 | 56 | 54 | 52 | 56 | 56 |
| Width of end cover rubber W (mm) | | 15 | 15 | 15 | 15 | 15 | 15 | 15 |
| Test results | trouble form | partial separation on circumference | about pecking | about pecking | about pecking | about pecking | about pecking | about pecking |
| | crack length: (index) | 100 | 80 | 76 | 72 | 68 | 80 | 78 |

TABLE 2

| Items | | Conventional Example | \multicolumn{7}{c}{Examples} |
|---|---|---|---|---|---|---|---|---|---|
| | | | 7 | 8 | 9 | 10 | 11 | 12 | 13 |
| 100% Modulus (kgf/cm$^2$) | $M_y$ | 60 | 60 | 60 | 60 | 60 | 60 | 60 | 60 |
| | $M_4$ | 60 | 80 | 80 | 80 | 80 | 80 | 80 | 80 |
| | $M_5$ | 60 | 56 | 56 | 56 | 56 | 56 | 56 | 56 |
| Modulus ratio | $M_4/M_y$ | 1.00 | 1.33 | 1.33 | 1.33 | 1.33 | 1.33 | 1.33 | 1.33 |
| | $M_5/M_x$ | 1.00 | 0.93 | 0.93 | 0.93 | 0.93 | 0.93 | 0.93 | 0.93 |
| Gauge | $G_{4E}$ (mm) | 0.5 | 0.3 | 0.5 | 0.5 | 0.5 | 0.5 | 0.5 | 0.5 |
| | $G_{5E}$ (mm) | 2.5 | 2.5 | 3.0 | 2.5 | 2.5 | 2.5 | 2.5 | 2.5 |
| $M_4$-$(M_4-M_x)$ $(G_{4E}/G_{5E})$ | | 60 | 58 | 57 | 56 | 56 | 56 | 56 | 56 |
| Width of end cover rubber w (mm) | | 15 | 15 | 15 | 2 | 5 | 10 | 20 | 15 |
| Test results | trouble form | partial separation on circumference | about pecking | about pecking | about pecking | about pecking | about pecking | about pecking | about pecking |
| | crack length: (index) | 100 | 84 | 82 | 86 | 82 | 80 | 80 | 70 |

TABLE 3

| Items | | \multicolumn{7}{c}{Comparative Examples} |
|---|---|---|---|---|---|---|---|---|
| | | 1 | 2 | 3 | 4 | 5 | 6 | 7 |
| 100% Modulus (kgf/cm$^2$) | $M_x$ | 56 | 80 | 56 | 80 | 60 | 60 | 60 |
| | $M_4$ | 80 | 60 | 60 | 56 | 56 | 68 | 80 |
| | $M_5$ | 60 | 56 | 80 | 60 | 80 | 50 | 56 |
| Modulus ratio | $M_4/M_x$ | 1.43 | 0.75 | 1.07 | 0.70 | 0.93 | 1.13 | 1.33 |
| | $M_5/M_x$ | 1.07 | 0.70 | 1.43 | 0.75 | 1.33 | 0.83 | 0.93 |
| Gauge | $G_{4E}$ (mm) | 0.5 | 0.5 | 0.5 | 0.5 | 0.5 | 0.5 | 0.5 |
| | $G_{5E}$ (mm) | 2.5 | 2.5 | 2.5 | 2.5 | 2.5 | 2.5 | 2.5 |
| $M_4$-$(M_4-M_x)$ $(G_{4E}/G_{5E})$ | | 51 | 84 | 55 | 85 | 61 | 58 | 56 |
| Width of end cover rubber w (mm) | | 15 | 15 | 15 | 15 | 15 | 15 | 1 |
| Test results | Trouble form | partial separation on circumference | partial separation on circumference | full separation on circumference | partial separation on circumference | full separation on circumference | partial separation on circumference | partial separation on circumference |
| | Crack length: (index) | 105 | 120 | 190 | 125 | 195 | 95 | 100 |

Figure 4:
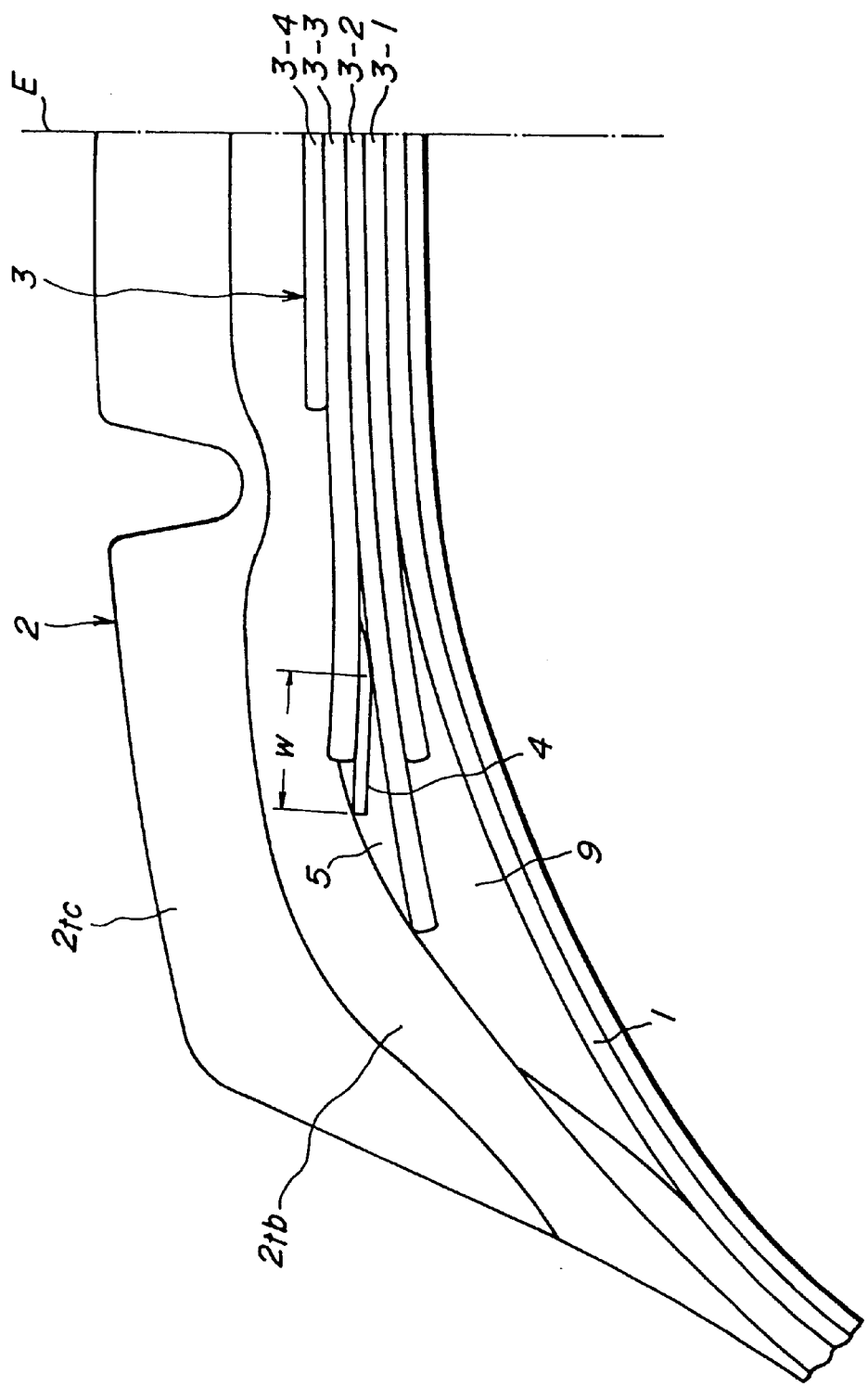
FIG. 4 is a left-half section view of a main part of a second embodiment of the heavy duty pneumatic radial tire according to the invention.

In Group 2, tires of Examples 14–16 are produced according to FIG. 4 based on the tire of Example 5 together with tires of Comparative Examples 8–12 and the conventional tire. In these tires, the end cover rubber 4 is arranged to cover the surface of the end portion at the one side (inside in the radial direction) of the narrow-width cord layer facing to the space cushion rubber 5 and extend over the end portion outside the tire, and a rubber having the same rubber composition is used as the rubbers 4 and 5 and the coating rubber for the cord layers 3-1 to 3-4 in the belt. The values of 100% moduli $M_4$, $M_5$ and Mx are shown in Table 4.

TABLE 4

| | Items | Examples | | | Comparative Examples | | | | | Conventional Example |
|---|---|---|---|---|---|---|---|---|---|---|
| | | 14 | 15 | 16 | 8 | 9 | 10 | 11 | 12 | |
| 100% Modulus (kgf/cm²) | $M_4$ | 80 | 90 | 100 | 80 | 70 | 60 | 56 | 56 | 60 |
| | $M_6$ | 56 | 56 | 56 | 60 | 80 | 56 | 80 | 60 | 60 |
| | $M_x$ | 60 | 60 | 60 | 56 | 56 | 80 | 60 | 80 | 60 |
| Test results | Trouble form | about pecking | about pecking | about pecking | partial separation on circumference | full separation on circumference | partial separation on circumference | full separation on circumference | partial separation on circumference | partial separation on circumference |
| | Crack length (index) | 85 | 82 | 80 | 103 | 160 | 115 | 165 | 120 | 100 |

In Group 3, tires of Examples 17–20 are produced according to FIG. 5 based on the tire of Example 4 together with tires of Comparative Examples 13–17 and the conventional tire. The values of 100% modulus Mx of the coating rubber for the cord layers in the belt, 100% modulus $M_{14i}$ of inner end cover rubber 14i 100% modulus $M_{14o}$ of outer end cover rubber 14o in the double end cover rubber 14 are shown in Table 5.

TABLE 5

| | Items | Examples | | | | Comparative Examples | | | | | Conventional Example |
|---|---|---|---|---|---|---|---|---|---|---|---|
| | | 17 | 18 | 19 | 20 | 13 | 14 | 15 | 16 | 17 | |
| 100% modulus (kgf/cm²) | $M_{14o}$ | 100 | 115 | 130 | 100 | 100 | 70 | 70 | 60 | 60 | 60 |
| | $M_{14i}$ | 70 | 70 | 70 | 60 | 60 | 100 | 60 | 100 | 70 | 60 |
| | $M_x$ | 60 | 60 | 60 | 60 | 70 | 60 | 100 | 70 | 100 | 60 |
| Test results | Crack growing form | outward from $C_{3E}$ | outward from $C_{3E}$ | outward from $C_{3E}$ | outward from $C_{3E}$ | outward from $C_{3E}$ | outward from $C_{3E}$ | outward from $C_{3E}$ | outward from $C_{3E}$ | outward from $C_{3E}$ | outward from $C_{3E}$ |
| | Crack length (index) | 90 | 85 | 81 | 93 | 97 | 220 | 210 | 240 | 230 | 100 |

In Group 4, tires of Examples 21–23 provided with the wavy end cover rubber 24 for the narrow-width cord layer 3-3 are produced according to FIG. 6 based on Example 5 together with tires of Comparative Examples 18, 19 provided with the wavy end cover rubber having a height H between bottom and peak of wavy surface different from those of the examples. The height H (mm) of the wavy form in these tires is shown in Table 6.

TABLE 6

| | Examples | | | Comparative Examples | |
|---|---|---|---|---|---|
| Items | 21 | 22 | 23 | 18 | 19 |
| Height of wave form H (mm) | 0.07 | 0.15 | 0.20 | 0.0 | 0.3 |
| Test results Trouble form | about pecking | about pecking | about pecking | about pecking | about pecking |
| Crack | 92 | 85 | 89 | 100 | 96 |

TABLE 6-continued

| | Examples | | | Comparative Examples | |
|---|---|---|---|---|---|
| Items | 21 | 22 | 23 | 18 | 19 |
| length (index) | | | | | |

In Group 5, tires of Examples 24–27 provided with the double cushion rubber 6 comprised of inner rubber 6i and outer rubber 6u are produced according to FIG. 7 based on the tire of Example 5 removing the end cover rubber together with tires of Comparative Examples 20–24 and the conventional tire. The values of 100% moduli $M_{6i}$, $M_{6u}$ and Mx' of the inner rubber 6i, outer rubber 6u and coating rubber for the cord layer 3-3 are shown in Table 7.

TABLE 7

| | Items | Examples | | | | Comparative Examples | | | | | Conventional Example |
|---|---|---|---|---|---|---|---|---|---|---|---|
| | | 24 | 25 | 26 | 27 | 20 | 21 | 22 | 23 | 24 | |
| 100% Modulus (kgf/cm²) | $M_{6i}$ | 60 | 60 | 60 | 56 | 56 | 45 | 60 | 45 | 60 | 60 |
| | $M_{6u}$ | 54 | 45 | 36 | 45 | 60 | 60 | 56 | 56 | 45 | 60 |
| | $M_x$ | 60 | 60 | 60 | 60 | 45 | 56 | 45 | 60 | 56 | 60 |
| Test Results | Trouble form | about pecking | about pecking | about pecking | about pecking | full separation on circumference | full separation on circumference | full separation on circumference | full separation on circumference | partial separation on circumference | partial separation on circumference |
| | Crack length (index) | 93 | 85 | 80 | 84 | 190 | 185 | 195 | 165 | 120 | 100 |

In Group 6, tires of Examples 28–31 provided with a projected space rubber 7 are produced according to FIG. 8 based on the tire of Example 5 together with a tire of Comparative Example 25 and the conventional tire. The values of 100% moduli $M_7$, $M_4$, $M_5$ and $M_x'$ of the space rubber 7, end cover rubber 4, space cushion rubber 5 and coating rubber for the cord layer 3-3 are shown in Table 8.

TABLE 8

| | Items | Examples | | | | Comparative Example 25 | Conventional Example |
|---|---|---|---|---|---|---|---|
| | | 28 | 29 | 30 | 31 | | |
| 100% modulus (kgf/cm²) | $M_7$ | 80 | 100 | 120 | 120 | 40 | 60 |
| | $M_4$ | 60 | 60 | 60 | 80 | 60 | 60 |
| | $M_5$ | 60 | 60 | 60 | 56 | 60 | 60 |
| | $M_x'$ | 60 | 60 | 60 | 60 | 60 | 60 |
| Test results | trouble form | about pecking | about pecking | about pecking | about pecking | partial separation on circumference | partial separation on circumference |
| | crack length: (index) | 94 | 92 | 90 | 74 | 103 | 100 |

In Group 7, tires of Examples 32–35 provided with the side space rubber 8 are produced according to FIG. 9 based on the tire of Example 5 together with a tire of Comparative Example 26 and the conventional tire. The values of 100% moduli $M_8$, $M_4$, $M_5$ and $M_x$ of the space rubber 8, end cover rubber 4, space cushion rubber 5 and coating rubber for the cross cord layers 3-2, 3-3 are shown in Table 9.

TABLE 9

| | Items | Examples | | | | Comparative Example 26 | Conventional Example |
|---|---|---|---|---|---|---|---|
| | | 32 | 33 | 34 | 35 | | |
| 100% modulus (kgf/cm²) | $M_8$ | 54 | 45 | 36 | 45 | 70 | 60 |
| | $M_6$ | 60 | 60 | 60 | 80 | 60 | 60 |
| | $M_5$ | 60 | 60 | 60 | 56 | 60 | 60 |
| | $M_x$ | 60 | 60 | 60 | 60 | 60 | 60 |
| Test results | trouble form | about pecking | about pecking | about pecking | about pecking | partial separation on circumference | partial separation on circumference |
| | crack length: (index) | 94 | 92 | 90 | 76 | 104 | 100 |

In Group 8, tires of Examples 36–38 applying a wide-width coating rubber Rc to the narrow-width cord layer 3-3 are produced according to FIG. 11 based on the tire of Example 5 together with tires of Comparative Examples 27, 28. The distance y (mm) between the cord end $C_{3E}$ in the narrow-width cord layer 3-3 and the end 3-3e of the coating rubber Rc is shown in Table 10.

TABLE 10

| Items | | Examples 36 | 37 | 38 | Comparative Examples 27 | 28 |
|---|---|---|---|---|---|---|
| Distance | y (mm) | 0.1 | 0.3 | 0.5 | 0.0 | 1.0 |
| Test results | trouble form | about pecking | about pecking | about pecking | about pecking | about pecking |
| | crack length: (index) | 85 | 72 | 73 | 100 | 95 |

Each tire in Examples 1–16 and 21–38, Comparative Examples 1–12 and 18–28 and Conventional Examples of Groups 1, 2 and 4–8 other than Group 3 is pushed on a drum of a testing machine under conditions of internal pressure: 7.00 kgf/cm² and load: 2600 kgf and run at a speed of 60 km/h over a distance of 100,000 km and thereafter taken out from the testing machine. Then, the tire is cut to measure a crack length grown the most among cracks created at the end portion of the belt 3. Such a crack is created in the end portion of the third cord layer in all tires. The crack length is an average of values measured on 30 positions at substantially an equal interval in the circumference of the tire and represented by an index on the basis that the conventional example or comparative example is 100. The smaller the index value, the better the property of controlling the occurrence of cracks. The test results are also shown in Tables 1–4 and 6–10 as a form of trouble and a crack length (index).

In the term "Trouble form", the separation means interlaminar separation between the narrow-width cord layer 3-3 and the cord layer 3-2, and the wording "partially separation on circumference or partial separation" means that the separation is partially created along the circumference, and the wording "about pecking" means that the trouble at the end of the narrow-width cord layer is controlled to a pecking degree.

Each tire in Examples 17–20, Comparative Examples 13–17 and the conventional example in Group 3 is pushed on a drum of a testing machine provided on its circumference with 6 semi-spherical projections having a radius of 30 mm to strike each projection onto the end portion of the narrow-width cord layer 3-3 under conditions of internal pressure: 7.00 kgf/cm² and load: 2600 kgf and then run at a speed of 60 km/h over a distance of 100,000 km. The evaluation is carried out in the same manner as described above to obtain test results as shown in Table 5. In this case, however, the trouble form is expressed as a crack growing form for including the growing direction of the crack, in which the wording "outward from $C_{3E}$" means a state of growing the crack slantly from the cord end $C_{3E}$ toward the outside of the tire without growing along the cord $C_3$. This test of riding over the projection is high in the reliability as an alternative test for running on bad road.

As seen from tables 1–10, the tires of Examples 1–38 do not show the occurrence of partial separation and largely decrease the crack length, so that they are considerably superior to the tires of the comparative examples and conventional examples in the resistance to crack growth and the separation resistance. This is true to prove that the first to seventh aspects of the invention are considerably effective to control the growth of cracks individually or in combination thereof.

As mentioned above, according to the invention, the occurrence and growth of cracks liable to be created at the end portions of the cross cord layers are advantageously controlled by rationalizing distribution of 100% moduli between coating rubbers for the cross cord layers in the belt and rubber neighborhood to the end portion of these layers or further by arranging a new rubber member on the end portions of the cross cord layers and slightly widening the width of the coating rubber for the narrow-width cord layer without causing any inconvenience in the structure of the belt itself, whereby it is possible to largely improve the separation resistance of the belt. As a result, the invention can provide heavy duty pneumatic radial tires capable of not only assuring a long service life in a new product but also sufficiently coping with repetitive recapping.

What is claimed is:

1. A heavy duty pneumatic radial tire comprising a radial carcass toroidally extending between a pair of bead cores embedded in a pair of bead portions and a belt superimposed about an outer periphery of the carcass to reinforce a tread portion and comprised of at least three rubberized cord layers, cords of two adjacent layers among these layers being crossed with each other at an acute cord angle with respect to an equatorial plane of the tire to form cross cord layers, in which an outer cord layer of the cross cord layers in a radial direction of the tire has a width narrower than that of an inner cord layer, and the cross cord layers are provided with a space cushion rubber separating end portions of these layers and extending from an end of the narrow-width cord layer toward the outside of the tire, and the space cushion rubber is a rubber composite comprised of an inner rubber extending so as to separate the end portions of the layer from each other and an outer rubber extending from the inner rubber toward the outside of the tire and having at least two different rubber compositions, and 100% moduli Mx', M6$i$ and M6$u$ in kgf/cm² of a coating rubber for the narrow-width outer cord layer, inner rubber 6$i$ and outer rubber 6$u$ establish a relationship of M6$u$<M6$i$≦Mx'.

* * * * *